(12) United States Patent
Jain

(10) Patent No.: US 10,269,066 B2
(45) Date of Patent: *Apr. 23, 2019

(54) AUTOMATED COLLATERAL RISK AND BUSINESS PERFORMANCE ASSESSMENT SYSTEM

(71) Applicant: Pramod Jain, Vaughan (CA)

(72) Inventor: Pramod Jain, Vaughan (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/014,120

(22) Filed: Jun. 21, 2018

(65) Prior Publication Data

US 2019/0080399 A1    Mar. 14, 2019

Related U.S. Application Data

(63) Continuation-in-part of application No. 15/701,717, filed on Sep. 12, 2017.

(51) Int. Cl.
*G06Q 40/02* (2012.01)
*G06N 20/00* (2019.01)

(52) U.S. Cl.
CPC ........... *G06Q 40/025* (2013.01); *G06N 20/00* (2019.01)

(58) Field of Classification Search
CPC .................................................. G06Q 40/025
USPC ...................................................... 705/35–45
See application file for complete search history.

(56) References Cited

U.S. PATENT DOCUMENTS

| 6,850,643 | B1* | 2/2005 | Smith, II | G06Q 40/02 |
| | | | | 382/173 |
| 2007/0106591 | A1* | 5/2007 | Waisbren | G06Q 40/02 |
| | | | | 705/36 R |

* cited by examiner

*Primary Examiner* — Robert R Niquette

(57) ABSTRACT

A system that automatically manages a collateral risk and a business performance of an entity is provided. The system generates a customizable database to store critical accounting and ancillary business information. The system automatically updates the customized database at predefined time periods based on new accounting and ancillary business information. The system automatically enables the customized database for scalable assessment of a collateral risk and a business performance of an entity. The system determines the collateral risk and business performance of an entity and provides the collateral risk, and business performance of the entity and an analytical summary of the accounting and the ancillary business information to a machine learning model. The system recommends actions to be performed to reduce the collateral risk and to improve the business performance based on the accounting and ancillary business information. The system enables a user to perform the actions to reduce the collateral risk and to improve the business performance of the entity.

20 Claims, 32 Drawing Sheets

EXTRACTING ACCOUNT RECEIVABLE (AR) ACTIVITY SUMMARY REPORTS THAT ARE RELEVANT TO EACH LOAN LEDGER AND EACH ACCOUNT OF GENERAL LEDGER (GL) FOR A RECENT ACCOUNTING PERIOD END
1902

↓

RECONCILING AR ACTIVITY DATA OF THE RECENT ACCOUNTING PERIOD, WITH REFERENCE TO A TYPE OR CATEGORY OF TRANSACTIONS BASED ON THE AR ACTIVITY SUMMARY REPORTS RELATED TO EACH LOAN LEDGER AND EACH ACCOUNT OF THE GL, FOR A CURRENT ACCOUNTING PERIOD, WHEREIN THE TYPE OR CATEGORY OF THE TRANSACTIONS INCLUDES AT LEAST ONE OF (A) GROSS SALES, (B) DILUTIVE OR NON-DILUTIVE CREDITS ISSUED OR (C) CASH COLLECTED FOR ANY ADJUSMENTS POSTED TO THE AR
1904

↓

CALCULATING AR TURNOVER DAYS AND DILUTION IN PERCENTAGE BY ANALYZING THE RELEVANT AR ACTIVITY SUMMARY REPORTS
1906

↓

UPDATING A DATABASE WITH THE AR ACTIVITY DATA FOR EVALUATION, RECONCILIATION AND FOR GENERATING CUSTOMIZABLE ANALYTICAL REPORTS
1908

FIG. 19

AUTOMATED COLLATERAL RISK AND BUSINESS PERFORMANCE ASSESSMENT SYSTEM

BACKGROUND

Technical Field

The embodiments herein generally relate to a collateral risk and business performance assessment system, and more specifically to a system and method for automatically managing the collateral risk and business performance of an entity.

Description of the Related Art

At present, particularly in an existing/continuing commercial lending relationship and more particularly in an asset based lending relationship or large factoring relationships, lenders/stakeholders may perform a very basic and limited month to month review of trends of account receivable (e.g. account receivable of key customers, account receivable levels and account receivable aging etc.), account payable (e.g. account payable of key vendors, account payable levels and account payable aging etc.) and inventory (e.g. inventory category, inventory levels etc.) of their borrowers for Collateral Management Review and risk management purposes. Lenders/stakeholders may also perform periodical examinations for a continuing borrower to ensure that periodical or monthly reporting by a borrower's business is fair and acceptable and does not require any adjustment in the covenants to contain or control the risk. Based on examination or evaluation assessment findings, risk parameters are updated. Frequency of these examinations and review may be quarterly or tri-annually or half yearly or yearly (or no examination at all) depending upon the level or complexity or structure of borrowings, liquidity to draw advance per the covenants, health of the borrower, its business performance, the industry where it operates in and other micro or macro-economic factors. In order to develop the portfolio, the lenders or stakeholders agree for performing for a yearly examination or no examination at all (in case of a cash flow type of commercial lending deal).

Cost of performing a periodical examination is generally expensive, which is typically borne by the borrowers. Typically, the cost for performing each borrower examination, for example with a revenue of say $50 million and credit line of say $10 million, is approximately $7-10 thousand per examination plus other out of pocket expenses depending on a location of the business. Typically, each such examination consumes about 7-10 business days. If 3-4 examinations a year are carried out, then the business is expected to incur a cost of $40-50 thousand a year for a medium sized business with a yearly sales revenue of $25-50 million. These examinations are often avoided by borrowers as they, in an unsystematic and unorganized or short-staffed environment, require a lot of efforts to provide the information requested by the examiners for reconciliation, testing and analysis.

The key and critical reconciliations and analysis are performed only when the field examinations are performed. In this scenario, the stakeholders generally remain unaware of the key reconciling items and their trends on a period to period basis to evaluate their impact or underlying risks on their interest.

The examiners may be rotated periodically for a borrower client. Rotation of examiners is though a good practice as it allows fresh approach to look at the borrower's business, however an inherent negative aspect in rotation of examiners is that each new examiner changes the examination workbook as he/she likes. When performing critical reconciliations, information and analysis etc., the examiners finds difficulty in understanding the examination workbook or chooses to not to explore more (as unimportant) for attention of portfolio executives (Principals/Relationship Managers/Credit and Collateral Analysts). This situation becomes even more critical when portfolio executives also gets changed (shifting of duties) for various reasons or otherwise not experienced enough. Sometimes, stakeholders are not aware of the business volume and performance (i.e. turnover days) of important or critical customers. Similarly, the stakeholders are also not aware of the business volume and performance (i.e. turnover days) with important and critical vendors. Any surgical change in relationship with critical customers or vendors may need timely revision in risk parameters by the stakeholders.

Globally, the lenders perform a field examination to understand the borrower's business affairs, their accounting practices, systems employed, competency of key employees etc. and to build or close a relationship with the borrower. Based on the field examination findings and other inherent risks pertinent to the industry, other financial and non-financial facts in the knowledge of underwriter and based on lending parameters of the lender, a relationship with the borrower is established.

When a relationship is established, on a day to day basis, it is managed by designated portfolio executives by obtaining following reports and documents from the business (a) Weekly or more a Collateral Loan report (as and when the business needs to borrow from the lender), (b) Periodical/monthly 'Borrowing Base certificate' with calculation of ineligibles/Statement of liquidity, (c) Account receivable Aging (summary and detailed) in each currency—linked to each loan ledger account, (d) Inventory perpetual listing detailed and location summary, (e) Account payable Aging (summary) in each currency, (f) Inventory Ineligibles details, (g) Month/period end financial statements in base currency and (h) Covenants calculation and certification.

In current times, changes in the business world happen rapidly: May it be due to political developments or changes in overall economic scenario or technological innovation or unknown competition coming up, over which the borrower's business may not have any control but is subjected to it. Changes may also happen with reference to the borrower business: financial difficulties, outdated production or business processes, losing a big customer, and management/leadership changes in the borrower's business, litigations by someone impacting the business, government investigations, inability to comply with tax and other laws and numerous reasons that may not be even imagined. It has often been seen that the stakeholders are often not made aware of or manage these risks timely.

In case of any downturn of the business or industry or economy in general (due to any known macro or micro economic and unknown reasons or circumstances), the stakeholders need to be aware of how to protect their collateral interest and may not be so aware of, weather it may be due to its incompetent portfolio management professionals or any issues not reported by the borrower (willingly or unwillingly, concerning its internal affairs that may impact economic viability and affairs of that business out of control).

Therefore, to overcome the existing problems and challenges, there remains a need for a system and method for automatically managing the collateral risk and business performance of an entity.

SUMMARY

In view of the foregoing, an embodiment herein provides a system for automatically managing of a collateral risk and a business performance of an entity or entities in a group located at different geographical locations and operating in different basic operating currencies in a common borrowing or owner relationship is provided. The system includes a memory and a processor. The memory stores a set of instructions. The processor executes the set of instructions to (i) generate a customizable database to store critical accounting and ancillary business information; (ii) automatically update the customized database at predefined time periods based on new accounting and ancillary business information received from the respective data system; and (iii) automatically enable the customized database for scalable assessment of a collateral risk and a business performance of an entity.

The database is generated by (a) extracting current accounting period information associated with one or more accounts in a general ledger (GL) along with its groupings with reference to financial statements; (b) extracting current accounting period information associated with one or more collateral accounts in a borrowing base structure along with its groupings with reference to covenants with stakeholders that are linked in one or more lender's or stakeholder's books in case of external funding; (c) extracting current accounting period information associated with one or more customers; (d) extracting current accounting period information associated with various types of inventories that include at least one of broad categories, sub-categories or locations; (e) extracting current accounting period information associated with one or more vendors; (f) extracting, current accounting period information associated with one or more treasury accounts in the GL with its groupings with reference to financial statements and the one or more collateral accounts in the one or more lender's or stakeholder's books for collateral management; (g) automatically processing the extracted current accounting period information associated with the one or more accounts, the one or more collateral accounts, the one or more customers, the inventories and the one or more vendors to correct data extraction errors using a quality control system; (h) automatically determining one or more parameters from the extracted current accounting period information associated with the one or more accounts, the one or more collateral accounts, the one or more customers, the inventories and the one or more vendors by analyzing the current accounting period information using a data analysis technique; (i) automatically generating memory blocks in the database for each of the one or more parameters using a database generation technique upon receiving one or more inputs from a user; and mapping current accounting period information associated with each of the one or more parameters with the respective memory blocks to obtain a customized database.

The current accounting period information associated with the collateral accounts includes at least one of account receivable, an inventory or other collateral. The current accounting period information associated with the one or more accounts is obtained from a general ledger accounts data system. The current accounting period information associated with the one or more accounts in the general ledger includes account receivable, account payable subledger, different treasury (bank) accounts. The current accounting period information associated with the one or more customers is obtained from a customer account receivable data system that are linked to the respective accounts in the GL and the respective collateral accounts in the one or more lender's or stakeholder's books for collateral management. The current accounting period information associated with the one or more customers includes a summary of periodical transactions associated with the one or more customers with reference to a type of the respective periodical transactions. The current accounting period information associated with various types of inventories is obtained from an inventory data system that are linked to the respective accounts in the GL and the respective collateral accounts in the one or more lender's or stakeholder's books for collateral management. The current accounting period information associated with the inventory includes a summary of period end status of the inventories. The current accounting period information associated with the one or more vendors is obtained from a vendor accounts data system and accruals that are linked to the respective accounts in the GL. The current accounting period information associated with the one or more vendors includes a summary of periodical transactions associated with the one or more vendors with reference to a type of the respective periodical transactions. The current accounting period information associated with the one or more treasury accounts is obtained from a treasury accounts data system. The one or more parameters includes at least one of opening balance, gross sales, cash received, cash paid, turnover, discounts, credits, receivables, general ledger balance, variance, dilution, cost of sales, expenses, profit, loss, bad debts, or tax. The current accounting period information includes at least one of account receivable, inventory and account payable information.

The scalable assessment of the collateral risk and business performance includes (i) analyze the accounting and ancillary business information associated with the one or more collateral accounts to generate customizable analytical reports for assessing the collateral risk and the business performance; (ii) implement a summarization technique to generate a summary of the accounting and ancillary business information based on the analytical report; and (iii) generate an analytical summary includes at least one of trends, variances and swings in reconciling items on a consistent pattern related to the account receivable, the inventory, the accounts payable and accruals, treasury accounts and government enacted legal liabilities with relevant accounting, the non-financial information and the ancillary business information that is critical to assess the collateral risk, and the business performance or stability.

The processor further executes the set of instructions to determine the collateral risk, and the business performance of an entity, provide the collateral risk, the business performance of an entity and the analytical summary of the accounting and the ancillary business information to a machine learning model using a business intelligence tool, recommend one or more actions to be performed to reduce the collateral risk and to improve the business performance based on the accounting and ancillary business information using the machine learning model, and enable a user to perform the one or more actions to reduce the collateral risk and to improve the business performance of the entity.

The summary of the accounting and ancillary business information includes financial information that is critical and non-financial information to assess the collateral risk and business performance. The financial information includes information related to account receivable (AR), account payable (AP), inventory, and treasury accounts that are recorded in the general ledger and secondary records. The non-financial information includes at least one of accounting practices, procedures, internal control and check relevant to the account receivable, account payable and inventory, customer credit rating, a customer or vendor business location, customer or vendor business type, credit, account receivable insurance limits, inventory locations, types, apparent contingent liabilities and accruals or reserves for government enacted legal liabilities.

In an embodiment, the processor is configured to modify the database for subsequent accounting periods by creating a new memory for a new parameter when the information associated with the new parameter is received from the respective data system during a current accounting period.

In another embodiment, the processor is configured to obtain the accounting and ancillary business information related to a prior assessment or review from the one or more memory in the database along with a summary of the non-financial and the financial information that are critical to generate a directive summary and provide the directive summary of the financial information that are critical and the non-financial information to an examiner for assessment of the collateral risk and the business performance.

In yet another embodiment, the processor is configured to provide a data warehouse interface to enter the accounting and ancillary business information that are critical to a type of business for assessing business and collateral performance and store the critical accounting and ancillary business information in the respective memory.

In one aspect, one or more non-transitory computer readable storage mediums storing one or more sequences of instructions, which when executed by one or more processors, causes performs a method for managing a collateral risk and a performance of an entity using a machine learning model by (a) generating a customizable database to store critical accounting and ancillary business information; (b) automatically updating the customized database at pre-defined time periods based on new accounting and ancillary business information received from the respective data system; and (c) automatically enabling the customized database for scalable assessment of a collateral risk and a business performance of an entity. The database is generated by (i) extracting current accounting period information associated with one or more accounts in a general ledger (GL) along with its groupings with reference to financial statements; (ii) extracting current accounting period information associated with one or more collateral accounts in a borrowing base structure along with its groupings with reference to covenants with stakeholders that are linked in one or more lender's or stakeholder's books in case of external funding; (iii) extracting current accounting period information associated with one or more customers; (iv) extracting current accounting period information associated with various types of inventories that include at least one of broad categories, sub-categories or locations; (v) extracting current accounting period information associated with one or more vendors; (vi) extracting current accounting period information associated with one or more treasury accounts in the GL with its groupings with reference to financial statements and the one or more collateral accounts in the one or more lender's or stakeholder's books for collateral management; (vii) automatically processing the extracted current accounting period information associated with the one or more accounts, the one or more collateral accounts, the one or more customers, the inventories and the one or more vendors to correct data extraction errors using a quality control system; (viii) automatically determining one or more parameters from the extracted current accounting period information associated with the one or more accounts, the one or more collateral accounts, the one or more customers, the inventories and the one or more vendors by analyzing the current accounting period information using a data analysis technique; (ix) automatically generating memory blocks in the database for each of the one or more parameters using a database generation technique upon receiving one or more inputs from a user; and (x) mapping current accounting period information associated with each of the one or more parameters with the respective memory blocks to obtain a customized database.

The current accounting period information associated with the one or more accounts is obtained from a general ledger accounts data system. The current accounting period information includes at least one of (i) different currency account payable, (ii) account payable sub-ledger or (c) different treasury (bank) accounts. The current accounting period information associated with the collateral accounts includes at least one of account receivable, an inventory or other collateral. The current accounting period information associated with the one or more customers is obtained from a customer account receivable data system that are linked to the respective accounts in the GL and the respective collateral accounts in the one or more lender's or stakeholder's books for collateral management. The current accounting period information associated with the one or more customers includes a summary of periodical transactions associated with the one or more customers with reference to a type of the respective periodical transactions. The current accounting period information associated with various types of inventories is obtained from an inventory data system that are linked to the respective accounts in the GL and the respective collateral accounts in the one or more lender's or stakeholder's books for collateral management. The current accounting period information associated with the inventory includes a summary of period end status of the inventories. The current accounting period information associated with the one or more vendors is obtained from a vendor accounts data system and accruals that are linked to the respective accounts in the GL. The current accounting period information associated with the one or more vendors includes a summary of periodical transactions associated with the one or more vendors with reference to a type of the respective periodical transactions. The current accounting period information associated with the one or more treasury accounts is obtained from a treasury accounts data system. The one or more parameters includes at least one of opening balance, gross sales, cash received, cash paid, turnover, discounts, credits, receivables, general ledger balance, variance, dilution, cost of sales, expenses, profit, loss, bad debts, or tax. The current accounting period information includes at least one of account receivable, inventory and account payable information.

The scalable assessment of the collateral risk and business performance includes (i) analyzing the accounting and ancillary business information associated with the one or more collateral accounts to generate customizable analytical reports for assessing the collateral risk and the business performance; (ii) implementing a summarization technique to generate a summary of the accounting and ancillary business information based on the analytical report; (iii) generating an analytical summary includes at least one of trends, variances and swings in reconciling items on a consistent pattern related to the account receivable, the inventory, the accounts payable and accruals, treasury accounts and government enacted legal liabilities with relevant accounting, the non-financial information and the ancillary business information that is critical to assess the collateral risk, and the business performance or stability; (iv) determining, using a business intelligence tool, the collateral risk, and the business performance of an entity and providing the collateral risk, the business performance of the entity and the analytical summary of the accounting and the ancillary business information to a machine learning model; (v) recommending, using the machine learning model, one or more actions to be performed to reduce the collateral risk and to improve the business performance based on the accounting and ancillary business information; and (vi) enabling a user to perform the one or more actions to reduce the collateral risk and to improve the business performance of the entity.

The summary of the accounting and ancillary business information includes financial information that is critical and non-financial information to assess the collateral risk and business performance. The financial information includes information relevant to the account receivable, account payable and inventory, and treasury accounts that are stored in the GL and secondary records. The non-financial information includes at least one of accounting practices, procedures, internal control and check relevant to the account receivable, account payable and inventory, customer credit rating, a customer or vendor business location, customer or vendor business type, credit, account receivable insurance limits, inventory locations, types, apparent contingent liabilities and accruals or reserves for government enacted legal liabilities.

In an embodiment, the method includes automatically modifying the database for subsequent accounting periods by creating a new memory block for a new parameter when the information associated with the new parameter is received from the respective data system during a current accounting period.

In another embodiment, the method includes automatically obtaining the accounting and ancillary business information related to a prior assessment or review from the one or more memory in the database along with a summary of the non-financial and the financial information that are critical to generate a directive summary; and providing the directive summary of the financial information that are critical and the non-financial information to an examiner for assessment of the collateral risk and the business performance.

In yet another embodiment, creating the database includes providing a data warehouse interface to enter the accounting and ancillary business information that are critical to a type of business for assessing business and collateral performance; and automatically storing the critical accounting and ancillary business information in the respective memory.

In yet another embodiment, creating the database includes the steps of automatically determining a base currency to represent the account receivable, the inventory, the account payable, the accruals and the treasury accounts information in the database.

In yet another embodiment, the generating of the analytical report includes (i) tracking imminent risks that are associated with the account receivable, the inventory, the account payable, the accruals and the treasury accounts information in the database; (ii) analyzing inherent risks by trending and comparing for aging, shifting in aging, reconciling items, percentages, turnover days, performance of the account receivable, performance of key and critical customers, conversion of receivable into cash and the account payable associated with the account receivable information respectively for an accounting period; (iii) analyzing inherent risks by trending and comparing for aging, shifting in aging, reconciling items, percentages, turnover days, performance of the account payable and the accruals respectively for the accounting period; and (iv) analyzing a trend and comparison for categories, locations, reconciling items, turnover days, percentages of inventory categories associated with the inventory perpetual for the accounting period.

In yet another embodiment, the generating of the analytical report includes (i) comparing the accounting and ancillary business information associated with the accounting period of a current year with same accounting period of last year or years; (ii) averaging or statistically analyzing the accounting and ancillary business information of the accounting period of the current year and the last year or years; and (iii) generating an analytical report based on the trends, comparison of the accounting and ancillary business information with comparable prior periods based on a type and seasonality of the business and averaging or statistically analyzing of the accounting and ancillary business information.

In yet another embodiment, the database is created to assess the collateral risks based on analysis of the trend corresponds to aging, reconciling items, weighted average turnover, step down turnover, variation in a time period and increase in the accounting and ancillary business information that are critical.

In yet another embodiment, the generating of the analytical report includes generating a snapshot of statistics of the accounting and ancillary business information associated with: (a) the one or more customers based on business volume, credit terms, a credit limit, an account receivable (AR) insurance limit, a longevity of business relationship, a type of customers business, a classification of the customers, a business location, a recent dated credit rating, AR balances from the customers who are critical for the business during recent accounting periods, a percentage AR from concentration accounts to a percentage AR of total business, changes or trends in the business volume and outstanding balances at recent accounting period compared to selected prior accounting periods, average AR balances, sales and collections from the critical customers during the accounting period; (b) the one or more vendors based on business volume, credit terms, a credit limit, a longevity of business relationship, a type of their business, a classification of the vendors, a business location, account payable (AP) balances from the customers who are critical for the business during recent accounting periods, a percentage AP from concentration accounts to a percentage AP of total business, changes or trends in the business volume and outstanding balances at recent accounting period compared to selected prior accounting periods, average AP balances, purchases and payments to the critical vendors during the accounting period, the periodical performance and the average AP balances from the critical customers of the selected prior accounting period are compared with the recent accounting period; and (c) a type, a plurality and composition of inventories based on business volume, a season of business, a type of business, a classification of the inventories, a location of the inventories that are critical for the business during the recent accounting periods, a percentage composition of critical inventory to a percentage of total business inventory, and changes or trends in the business volume and outstanding balances at recent accounting periods compared to selected prior accounting periods. The periodical performance and the average AR balances from the critical customers of the selected prior accounting period are compared with the recent accounting period;

In yet another embodiment, the updating of the database includes (i) obtaining account payable (AP) activity system reports that are relevant to each account of the GL for a recent accounting period; (ii) extracting an exchange rate for a new accounting period which converts foreign AP from the database based on the covenants at the recent accounting period; (iii) reconciling AP sub-ledger balance of the recent accounting period with the one or more accounts in the GL and AP accruals in the balance sheet for a current accounting period; (iv) applying the exchange rate for converting from the foreign AP to base currency AP; (v) calculating AP turnover days by analyzing the AP activity system reports; and (vi) updating the database with the AP sub-ledger balance for evaluation, reconciliation and for generating customizable analytical reports.

In yet another embodiment, the updating of the database includes (i) obtaining account payable (AP) activity summary reports that are relevant to each account of the GL for a recent accounting period; (ii) reconciling AP activity data of the recent accounting period, with reference to a type or category of transactions based on the AP activity summary reports related to each account of the GL, for a current accounting period; (iii) calculating AP turnover days by analyzing the AP activity summary reports; and (iv) updating the database with the AP activity data for evaluation, reconciliation and for generating customizable analytical reports. The type or category of the transactions includes at least one of (a) gross purchases, (b) account debits or (c) cash or any adjustments posted to the AP. The AP activity data includes overall purchases, payments made and the resultant turnover days.

In yet another embodiment, the updating of the database includes (i) obtaining a summary of account payable (AP) outstanding and aging relevant to each critical vendor for a recent accounting period; (ii) updating outstanding AP data for each critical vendor of the recent accounting period for a current accounting period; (iii) calculating overall AP turnover days related to vendor payouts for the recent accounting period; (iv) updating vendor data including a vendor location, a type of vendor business, terms provided, credit limit for the current accounting period; and (v) updating the database with the outstanding AP data for evaluation, reconciliation and for generating customizable analytical reports.

In yet another embodiment, the updating of the database includes (i) obtaining account receivable (AR) activity reports that are relevant to each loan ledger and each account in the GL for a recent accounting period; (ii) extracting an exchange rate which converts foreign AR collateral based on the covenants, the loan ledger of the recent accounting period for a current accounting period; (iii) reconciling AR sub-ledger balance that are relevant to each loan ledger of the recent accounting period with the one or more accounts of the GL, and in the balance sheet for the current accounting period; (iv) applying the exchange rate at the recent accounting period end for converting from the foreign AR to base currency AR; (v) calculating AR turnover days by analyzing the relevant AR activity reports; and (v) updating the database with the AR sub-ledger balance for evaluation, reconciliation and for generating customizable analytical reports.

In yet another embodiment, the updating of the database includes (i) obtaining account receivable (AR) activity summary reports that are relevant to each loan ledger and each account of the GL for a recent accounting period end; (ii) reconciling AR activity data of the recent accounting period, with reference to a type or category of transactions based on the AR activity summary reports related to each loan ledger and each account of the GL, for a current accounting period; (iii) calculating AR turnover days and dilution in percentage by analyzing the AR activity summary reports; and (iv) updating the database with the AR activity data for evaluation, reconciliation and for generating customizable analytical reports. The type or category of the transactions includes at least one of (a) gross sales, (b) dilutive or non-dilutive credits issued or (c) cash collected for any adjustments posted to the AR. The AR activity data include overall sales, payments received, credits given or adjustment posted and resultant turnover days.

In yet another embodiment, the updating of the database includes (i) obtaining account receivable (AR) activity summary data with ending balance relevant to each critical customer for a recent accounting period; (ii) updating the AR activity related to each critical customer of the recent accounting period for a current accounting period, with reference to a type or categories of transactions based on the AR activity summary data; (iii) calculating AR turnover days by analyzing the AR activity summary data; updating customer data including a customer location, a type of customer business, terms provided, credit limit and credit insurance limit; and (iv) updating the database, with the customer data, for evaluation, reconciliation and for generating customizable analytical reports for the current accounting period.

In yet another embodiment, the updating of the database includes (i) extracting (a) cash received from the AR activity data relevant to each loan ledger and each account of the GL for the recent accounting period and (b) cash received from non-AR activity; (ii) reconciling AR-treasury reconciliation data including the cash received from (a) the AR activity data for the current accounting period and (b) the non-AR activity with deposits in a designated account of the GL and the loan ledger for the current accounting period; and (iii) updating the database with the AR-treasury reconciliation data for evaluation, reconciliation and for generating customizable analytical reports.

In yet another embodiment, the updating of the database includes (i) obtaining collateral reports relevant to each loan ledger and each account of the GL for a recent accounting period; (ii) obtaining ineligibles and reserves at a current account period for each collateral based on the covenants relevant to each loan ledger at the recent accounting period; (iii) comparing the collateral reports, the ineligibles and the reserves in each loan ledger for the recent accounting period with new ineligibles and reserves that are received from the business in the database; (iv) obtaining updated balances of the ineligibles and the reserves of the current accounting periods in the respective loan ledger corresponding to the respective account of the GL in the database; (v) updating the database with the updated balances of the ineligibles and the reserves for evaluation, reconciliation and for generating customizable analytical reports; and (vi) obtaining a type of the new ineligibles and reserves that are reported, not reported and compared to prior accounting periods to assess an impact of the new ineligibles and reserves on the collaterals of the lender or stakeholders. Ineligibles and reserves that are newly obtained are incorporated in the respective loan ledger and respective account of the GL when the new ineligibles and reserves are compared to the ineligibles and the reserves of the recent accounting period.

In yet another embodiment, the updating of the database includes (i) obtaining a GL trail balance for a recent accounting period; (ii) comparing the GL trial balance of the recent accounting period with a GL trial balance in the database; (iii) obtaining updated balances of the GL trial balance for the current accounting period in balance sheet accounts corresponding to groupings and each account of the GL in the database; (iv) updating, using updated balances of the GL trial balance, the database for evaluation, reconciliation and for generating customizable analytical reports; and (v) obtaining a type of the new GL accounts to add the new GL accounts to assess an impact on the collaterals of the lender or stakeholders. Each account of the GL is sequenced as the account of the GL is grouped in the balance sheet. The GL accounts that are newly determined are added to the database with reference to balance sheet groupings and each account of the GL.

In yet another embodiment, the updating of the database includes (i) obtaining income statement for each category of expense and income for a recent accounting period; (ii) comparing the expenses and income for the recent accounting period within the database; (iii) obtaining updated balances of the income and expense for the current accounting periods with reference to groupings in the database; (iv) updating, using the updated balances of the income and expense, the database for evaluation, reconciliation and for generating customizable analytical reports; and (v) obtaining a type of new income and expense to assess an impact of the new income and expense heads on the collaterals of the lender or stakeholders.

In yet another embodiment, the updating of the database includes (i) obtaining current accounting period inventory analysis or a summary relevant to each account of the GL and loan ledger for a recent accounting period; (ii) summarizing current accounting period inventory analysis data including inventory ineligibles corresponding to at least one of the details of category, the sub-category, the location or the eligibility; (iii) reconciling current accounting period inventory with each of the loan ledger, each account of the GL and various inventory databases for the recent accounting period; and (iv) updating, using inventory analysis data, the database for evaluation, reconciliation and for generating customizable analytical reports. The inventory analysis or the summary relevant to each account of the GL includes at least one of details of category, sub-category, a location or eligibility.

In yet another embodiment, the updating of the database includes (i) obtaining inventory perpetual reports relevant to each account of the GL and the loan ledger for a recent accounting period; (ii) reconciling inventory data from the inventory perpetual reports with accounts of the GL, various inventory reserves and a balance sheet for the recent accounting period; (iii) calculating inventory turnover days using cost of goods sold in income statement data; and (iv) updating, using the inventory reconciliation data, the database for evaluation and generating customizable analytical reports. The inventory perpetual reports are system generated inventory status reports as of a particular date.

In yet another embodiment, the updating of the database includes (i) obtaining summary of transactions including debits and credits from transactions summary of each operating and loan bank accounts linked to a designated GL for a recent accounting period; (ii) reconciling treasury activity data including debits and credits for the recent accounting period corresponding to deposits and withdrawals in a designated bank account in the GL for a current accounting period; and (iii) updating, using the treasury activity data, the database for evaluation, reconciliation and for generating customizable analytical reports.

The system is used for evaluating risk continuously and employs an integrated approach to send a warning signal of an underlying/potential risk to the stakeholders before the situation goes out of control and losses are incurred. The system assesses the potential/collateral risk with periodical comparable data with reference to periodical changes in information that is associated with the customized database (e.g. turnover days, dilution, balances, liability, accrual, revenue, collections, existence or missing of a new account/location/customer/vendor/treasury account). The information that associated with the customized database may include the ancillary business information that could be any critical non-accounting/financial information (e.g. an impact due to change in accounting practices, procedures, internal control and check relevant to the account receivable, account payable and inventory, customer credit rating, a customer or vendor business location, customer or vendor business type, credit, account receivable insurance limits, inventory locations/types, accruals or reserves for government enacted legal liabilities, change in contingent liabilities with reference to new circumstances etc.). Further, the system generates a warning signal for the assessed potential/collateral risk based on the analysis of the critical data that is customized critical risk area for stakeholder's interest and control in its database. The analysis can also be customized by extracting the relevant data per the stakeholder's critical priorities, choices and preferences. The system can also be allowed to operate as a self-assessment filing of critical data by a business to its stakeholders, so that any potential risk is timely signaled and corrective action is taken at the end of a stakeholder. The system further solves a technical problem of a creating a customizable database to store the critical accounting and ancillary business information that is collected from the different data sources located at different geographical locations and operating in different platforms and updating the customizable database continuously to assess the potential risk or business performance of an entity. This system is very economical/inexpensive solution for risk management on a continuing basis. When compared to the periodical cost of field examination on yearly basis, this system reduces cost of field examination besides timely availability of warning signals to the portfolio managers without loss of time to better manage risks. When using this system by the lenders, field examination is required only in case if there are any warning signals thrown by the analytical reports. Instead of exhaustive field examination, limited scope field examination may be conducted by (a) performing invoice test (e.g. ship test and customer verification test), credit memo review, Concentration Customers Payment Analysis etc. (b) performing concentration Vendor Payment Analysis, review of AP and accruals impacting AR etc. (c) performing inventory test counts with location review and analysis, cost tests, gross margins tests, RM and FG turnover and age analysis, review of inventory on consignment, if any and (d) performing cancelled checks review, assessment of appropriateness of priority payables and other reserves etc.

The system further helps lenders/stakeholders to receive snapshot reports (i.e. customized report with reference to a business), covering key financial and reconciliation trends and analysis with non-financial information, possible risk indicators for efficient management of the collateral or business. With the help of this system, the business examination costs may be reduced to approximately 50% and the business examination may be performed within a short period of time. A specific scope field examination may be performed within maximum of 1-2 days.

The system further creates a customizable database where the entire critical data of the business for a completed accounting period may be keyed in and stored. The system further creates a customizable snapshot report where periodical snapshot reports critical for collateral control and business review may be generated from the database, and summarizes critical information relevant to the business (i.e. Enterprise resource planning system) and its capabilities (e.g. types of system reports that it can generate etc.), accounting practices, procedures, internal control and check etc. relevant to AR, AP inventory etc. The summary of critical information updates information on banking arrangement, insurance, lease, tax payments, pending litigation, critical staff for business management. The system further captures data from the various locations in the database and presents a summary numbers that are critical for planning examination scope focused in the direction covering all critical issues. The system manages the risks with specific focus on analysis of trends in reconciling items and reserves and turnover days in detailed alternative manner and detects the risks by the lenders/stakeholders in a better, exhaustive, standard, customizable, economical, meaningful and timely manner.

The system further ensures that collateral is reconciled with book of accounts and financial statements of the business and is linked with the loan ledger of the lender bank on a month to month/interim accounting period basis. The system further ensures that trends in reconciling accounts and the amounts of the collateral with book of accounts of the business and financial statements which are linked with the loan ledger of the lender bank on a month to month/interim accounting period basis are meaningfully analyzed for any possible risks. The system further ensures that payables and accruals are reconciled with the book of accounts and the financial statements of the business and are linked with AR or inventory collateral on a month to month/interim accounting period basis. The system further ensures that trends in reconciling payables and accruals and amounts of the payables and accruals with book of accounts of the business and financial statements on a month to month/interim accounting period basis are analyzed for any possible risks. The system further measures business performance and underlying risks in terms of (i) how AR is performing in terms of day's turnover at a business wide level as well as at an individual key/critical customer level, (ii) how AR is performing in terms of dilution and the underlying risks as the lender/stakeholder may want to have assessment from time to time, (iii) how the business manages its AP obligations in terms of day's turnover at a business wide level as well as at an individual key/critical vendor level and (iv) how the business manages its inventory in terms of day's turnover at a business wide level as well as at key/critical category level. The system further facilitates measuring and detecting business risks in terms of trend analysis with reference to aging, stepdown turnover, period to period variation and spikes in various critical areas for collateral management. The system further monitors the availability, liquidity, various reserves and ineligibles in borrowing base from month/period to month/period and ensure that loan balance is reconciled with the book of accounts of the business and is linked with the loan ledger of the lender bank on a month to month/interim accounting period basis.

The system further provides risk/warning signals timely by reading the current trends of critical data for efficient portfolio management and collateral control. Further, the system generates analytics for monitoring of the liquidity, collateral performance, key assets and liabilities in the recent past. The system further helps to control and review portfolio/collateral with system generated summary findings. The system expands or reduces the usage of the package based on availability of records or determination of underlying risks. The system further generates warning signals for which the portfolio managers are not able to disregard analyzing any data, information, reconciling items or trends. The system further helps the lenders/stakeholders to deal with the experienced examiners in creation of a risk-based database. The system reduces filed examination costs to approximately 50%. The examinations are quick affair and very specific in scope if required using the system.

The system further provides periodical information of the collateral/business on a timely basis to the lenders/stakeholders to avoid frequent lenders/stakeholders examinations and prohibitive costs.

The system further creates the database methodically and logically so that the examiners can focus on survey examinations. The survey examinations may be handled only by the examiners experienced in creation of the database by analyzing critical risk area's to be more focused onto. The system helps junior examiners to focus on testing (e.g. ship test, cost tests, gross margin test, turnover analysis etc.). The system further helps the examiners more wealth by creating database assignments. The system may organize the database in a customized manner with specific to a business on any database software and technology, cloud engineered systems and enterprise software products of database management systems (DBMS). The system may be organized on any DBMS's and include MySQL, PostgreSQL, MongoDB, XML, Microsoft SQL Server, browser-based Microsoft.NET, Java, Linux, Oracle, Sybase, SAP HANA, IBM DB2 server etc. Programming for the system may be done in various language e.g. PHP, Microsoft VB, Visual Studio, Visual C++, Transact-SQL, COBOL, Perl, Eiffel, Python, Pascal, Mercury, Mondrian, Oberon, Salford FTN95 (Fortran), SmallTalk, Standard ML, Dyalog APL and alike that integrates with any DBMS depending on the operating system being preferred.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 19 is a flow diagram that illustrates a method of updating the database with account receivable (AR) activity data according to an embodiment herein;

DETAILED DESCRIPTION OF PREFERRED EMBODIMENTS

Figure 1:
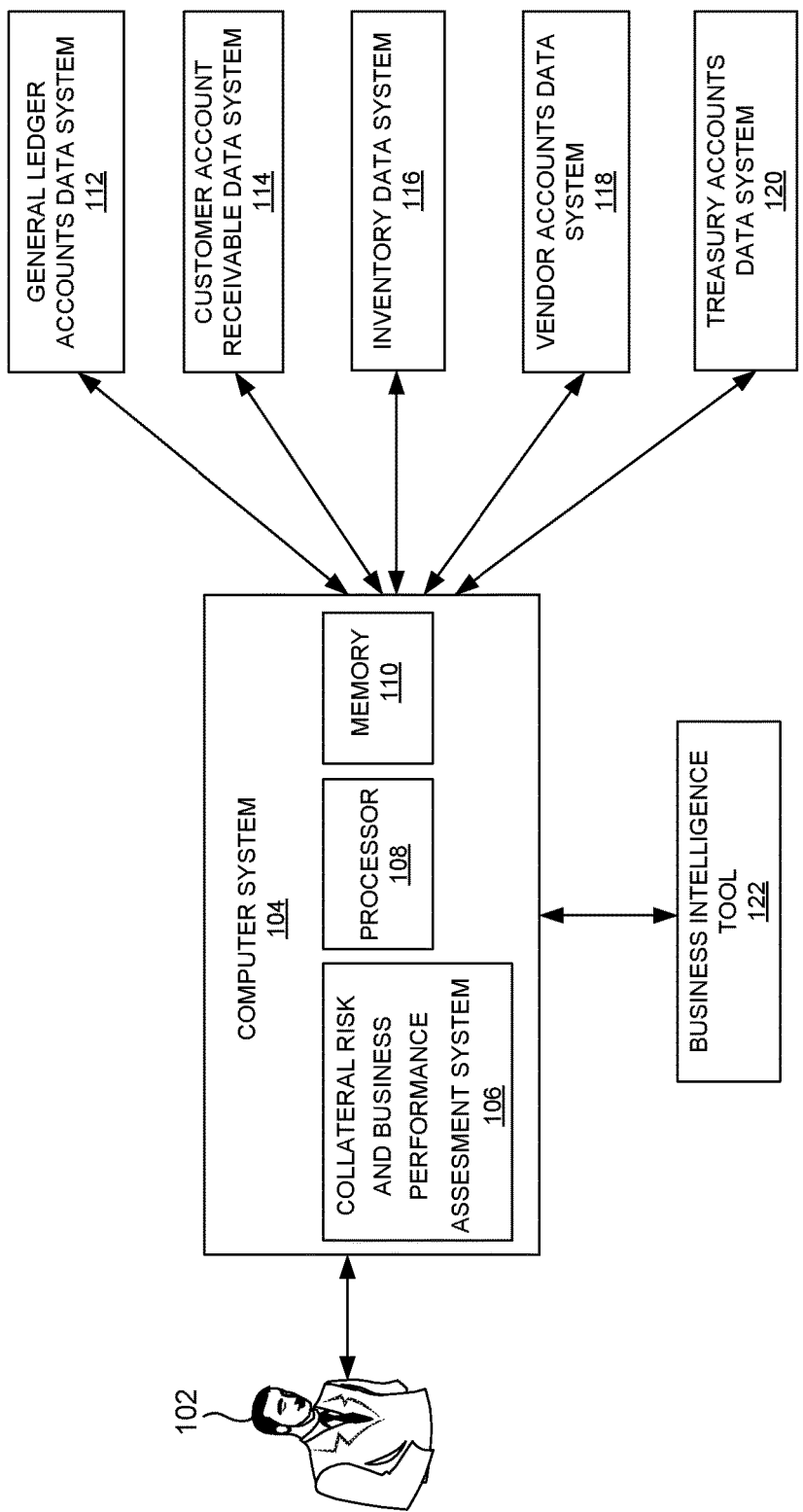
FIG. 1 is a system view illustrating a user interacting with a collateral risk and business performance assessment system using a computer system for automatically managing a collateral risk and a business performance of an entity according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein provide a method and system for automatic assessment of a collateral risk and a business performance of an entity using a collateral risk and business performance system. Referring now to the drawings, and more particularly to FIGS. 1 through 29, where similar reference characters denote corresponding features consistently throughout the figures, preferred embodiments are shown.

Definitions

The term "accounts payable" refers to the money owed by a business/entity to its suppliers (e.g. a liability on a company's balance sheet). The account payable is different from notes payable liabilities, which are debts created by formal legal instrument documents.

The term "account receivable" refers to the money owed to that company/entity by entities outside of the company. The account receivable is classified as current assets assuming that the account receivable is due within one calendar year or fiscal year.

The term "inventory" refers to goods and materials that a business holds for the ultimate goals to have a purpose of resale (or repair).

The term "collateral risk" refers to the risk of loss arising from errors in nature, quantity, pricing, or characteristics of collateral securing a transaction with credit risk.

The term "general ledger" refers to company's set of numbered, non-numbered or coded accounts for its accounting records. The ledger provides a complete record of financial transactions over the life of the company. The general ledger holds account information that is needed to prepare financial statements and includes accounts for assets, liabilities, owners' equity, revenues and expenses.

The term "inherent risk" refers to a risk posed by an error or omission in a financial statement due to a factor other than a failure of control. In a financial audit, inherent risk is most likely to occur when transactions are complex or in situations that require a high degree of judgment with regards to financial estimates.

The term "account payable (AP) activity system reports" refers to an indication that how do aging of outstanding vendors appears with reference to invoice date or due date. The AP activity system reports indicate that how diligent the business is in meeting its commitments to its vendors.

FIG. 1 is a system view illustrating a user 102 interacting with a collateral risk and business performance assessment system 106 using a computer system 104 for automatically managing a collateral risk and a business performance of an entity according to an embodiment herein. The computer system 104 further includes a memory 110 that stores a database and a set of instructions, and a processor 108 that is configured by the set of instructions to execute the collateral risk and business performance assessment system 106. The collateral risk and business performance assessment system 106 generates a customizable database to store critical accounting and ancillary business information. The collateral risk and business performance assessment system 106 generates the database. The collateral risk and business performance assessment system 106 extracts current accounting period information associated with a plurality of accounts in a general ledger (GL) along with its groupings with reference to financial statements. In an embodiment, the current accounting period information associated with a plurality of accounts is obtained from a general ledger accounts data system 112. The information associated with the plurality of accounts in the general ledger includes account payable, account payable sub-ledger and different treasury (bank) accounts. The collateral risk and business performance assessment system 106 also extracts current accounting period information associated with a plurality of collateral accounts in a borrowing base structure along with its groupings with reference to covenants with stakeholders that are linked in a plurality of lender's or stakeholder's books in case of external funding. The current accounting period information associated with the collateral accounts includes at least one of account receivable, an inventory or other collateral. The collateral risk and business performance assessment system 106 may extract current accounting period information associated with a plurality of customers that is current accounting period information associated with the plurality of customers is obtained from a customer account receivable data system 114 that are linked to the respective accounts in the GL and the respective collateral accounts in the plurality of lender's or stakeholder's books for collateral management. The current accounting period information associated with the plurality of customers includes a summary of periodical transactions associated with the plurality of customers with reference to a type of the respective periodical transactions. The collateral risk and business performance assessment system 106 also extracts current accounting period information associated with various types of inventories that include at least one of broad categories, sub-categories or locations that is the current accounting period information associated with various types of inventories is obtained from an inventory data system 116 that are linked to the respective accounts in the GL and the respective collateral accounts in the plurality of lender's or stakeholder's books for collateral management. The current accounting period information associated with the inventory includes a summary of period end status of the inventories. The collateral risk and business performance assessment system 106 extracts current accounting period information associated with a plurality of vendors that is the current accounting period information associated with the plurality of vendors is obtained from a vendor accounts data system 118 and accruals that are linked to the respective accounts in the GL. The current accounting period information associated with the plurality of vendors includes a summary of periodical transactions associated with the plurality of vendors with reference to a type of the respective periodical transactions. The collateral risk and business performance assessment system 106 extracts current accounting period information associated with a plurality of treasury accounts in the GL with its groupings with reference to financial statements and the plurality of collateral accounts in the plurality of lender's or stakeholder's books for collateral management. In an embodiment, the current accounting period information associated with a plurality of treasury accounts is obtained from a treasury accounts data system 120. The extracted current accounting period information associated with the plurality of accounts, the plurality of collateral accounts, the plurality of customers, the inventories and the plurality of vendors are processed to correct data extraction errors using a quality control system. The collateral risk and business performance assessment system 106 determines one or more parameters from the extracted current accounting period information associated with the plurality of accounts, the plurality of collateral accounts, the plurality of customers, the inventories and the plurality of vendors by analyzing the current accounting period information using a data analysis technique. The one or more parameters includes at least one of opening balance, gross sales, cash received, cash paid, turnover, discounts, credits, receivables, general ledger balance, variance, dilution, cost of sales, expenses, profit, loss, bad debts, or tax. The current accounting period information associated with each of the one or more parameters with the respective memory blocks are mapped to obtain a customized database. The current accounting period information includes at least one of account receivable, inventory and account payable information.

The collateral risk and business performance assessment system 106 automatically updates the customized database at predefined time periods based on new accounting and ancillary business information received from the respective data system. The collateral risk and business performance assessment system 106 enables the customized database for scalable assessment. The collateral risk and business performance assessment system 106 analyzes the accounting and ancillary business information associated with the plurality of collateral accounts to generate customizable analytical reports for assessing the collateral risk and the business performance. The collateral risk and business performance assessment system 106 implements a summarization technique to generates a summary of the accounting and ancillary business information based on the analytical report. The collateral risk and business performance assessment system 106 further generates an analytical summary that comprises at least one of trends, variances and swings in reconciling items on a consistent pattern related to the account receivable, the inventory, the accounts payable and accruals, treasury accounts and government enacted legal liabilities with relevant accounting, the non-financial information and the ancillary business information that is critical to assess the collateral risk, and the business performance or stability. The collateral risk and business performance assessment system 106 further determines the collateral risk, and the business performance of an entity and provides the collateral risk, the business performance of the entity and the analytical summary of the accounting and the ancillary business information to a machine learning model using a business intelligence tool 122. In an embodiment, the business intelligence tool 122 extracts the relevant data per the stakeholders critical priorities, choices and preferences. In an embodiment, different analytical summary/report based on different statistical or other parameters in different areas may be generated by using internal or external analytical tools. In another embodiment, the business intelligence tool 122 may include MS Power BI, Trifacta's Wrangler, Rapid Miner, Rattle GUI, Qlikview, Weka, Knime, Tableau, Talend, Orange etc. The collateral risk and business performance assessment system 106 employs the machine learning model to recommend one or more actions (e.g. limiting an advance percentage or an amount etc. or other similar actions) to be performed to reduce the collateral risk and to improve the business performance based on the accounting and ancillary business information. In an embodiment, the machine learning model is generated by providing (i) a summary of accounting and ancillary business information of different entities comprising at least one of trends, variances and swings in reconciling items on a consistent pattern related to account receivable, inventory, accounts payable and accruals, treasury accounts and government enacted legal liabilities with relevant accounting, the non-financial information and the ancillary business information that is critical to assess the collateral risk, and the business performance and stability of different entities, (ii) the calculated collateral risk and the business performance of different entities, and (iii) a financial expert inputs on the summary, the calculated collateral risk and the business performance of different entities, as training data. The collateral risk and business performance assessment system 106 enables a user to perform the one or more actions (e.g. limiting an advance percentage or an amount etc. or other similar actions) to reduce the collateral risk and to improve the business performance of the entity.

The summary of the accounting and ancillary business information includes financial information that is critical and non-financial information to assess the collateral risk and business performance. The financial information includes information related to account receivable (AR), account payable (AP), inventory, and treasury accounts as are recorded in the general ledger and secondary records. The non-financial information includes at least one of accounting practices, procedures, internal control and check relevant to the account receivable, account payable and inventory, customer credit rating, a customer or vendor business location, customer or vendor business type, credit, account receivable insurance limits, inventory locations, types, apparent contingent liabilities and accruals or reserves for government enacted legal liabilities.

The collateral risk and business performance assessment system 106 modifies the database for subsequent accounting periods by creating a new memory for a new parameter when the information associated with the new parameter is received from the respective data system during a current accounting period. The collateral risk and business performance assessment system 106 automatically extracts the accounting and ancillary business information related to a prior assessment or review from the plurality of memory in the database along with a summary of the non-financial and the financial information that are critical to generate a directive summary. The collateral risk and business performance assessment system 106 provides the directive summary of the financial information that are critical and the non-financial information to an examiner for assessment of the collateral risk and the business performance. The collateral risk and business performance assessment system 106 provide a data warehouse interface to enter the accounting and ancillary business information that are critical to a type of business for assessing business and collateral performance. The collateral risk and business performance assessment system 106 automatically stores the critical accounting and ancillary business information in the respective memory.

Figure 2:
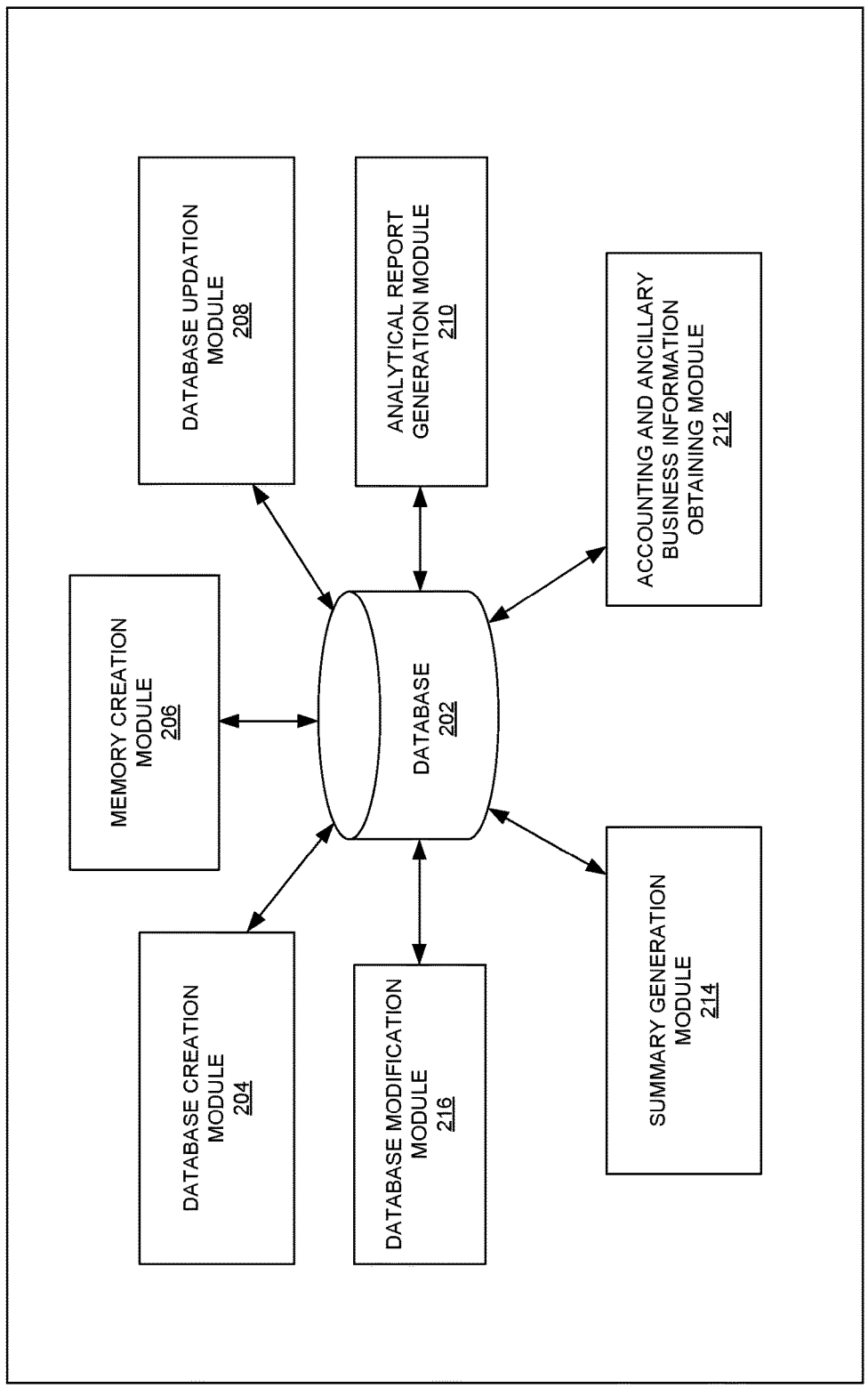
FIG. 2 illustrates an exploded view of the collateral risk and business performance assessment system of FIG. 1 according to an embodiment herein.

FIG. 2 illustrates an exploded view of the collateral risk and business performance assessment system 106 of FIG. 1 according to an embodiment herein. The collateral risk and business performance assessment system 106 includes a database 202, a database creation module 204, a memory creation module 206, a database updation module 208, an analytical report generation module 210, an accounting and ancillary business information obtaining module 212, a summary generation module 214 and a database modification module 216. The database 202 stores the account receivable, inventory, account payable information and the like. The database creation module 204 generates a customizable database to store critical accounting and ancillary business information. The memory creation module 206 generates a plurality of memory in the database 202 for storing account receivable, inventory and account payable information. The database updation module 208 automatically updates the database 202 at predefined time periods based on new accounting and ancillary business information received from the respective data system. The analytical report generation module 210 analyzes the accounting and ancillary business information associated with the plurality of collateral accounts to generate customizable analytical reports for assessing the collateral risk and the business performance automatically by enabling the customized database for scalable assessment. The accounting and ancillary business information obtaining module 212 automatically extracts the accounting and ancillary business information related to a prior assessment or review from the plurality of memory in the database 202 along with a summary of the non-financial and the financial information that are critical to generate a directive summary. The accounting and ancillary business information obtaining module 212 further provides the directive summary of the financial information that are critical and the non-financial information to an examiner for assessment of the collateral risk and the business performance. The summary generation module 214 generates a summary of the accounting and ancillary business information based on the analytical report. The summary of the accounting and ancillary business information includes financial information that is critical and non-financial information to assess the collateral risk and business performance. In an embodiment, the financial information includes information relevant to the account receivable, account payable, inventory, and treasury accounts that are stored in the GL and secondary records. In an embodiment, the non-financial information includes at least one of accounting practices, procedures, internal control and check relevant to account receivable, account payable, inventory, customer credit rating, a customer or vendor business location, customer or vendor business type, credit, account receivable insurance limits, inventory locations, types, apparent contingent liabilities and accruals or reserves for government enacted legal liabilities. The summary generation module 214 further generates an analytical summary that comprises at least one of trends, variances and swings in reconciling items on a consistent pattern related to the account receivable, the inventory, the accounts payable and accruals, treasury accounts and government enacted legal liabilities with relevant accounting, the non-financial information and the ancillary business information that is critical to assess the collateral risk, and the business performance or stability. The database modification module 216 automatically modifies the database 202 for subsequent accounting periods by creating a new memory for a new parameter when the information associated with the new parameter is received from the respective data system during a current accounting period.

Figure 3:
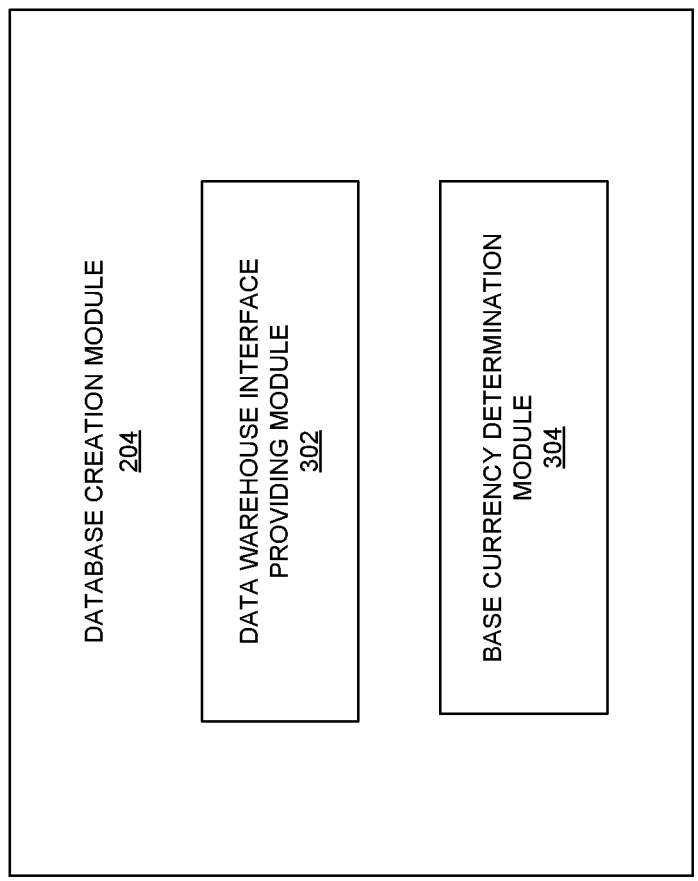
FIG. 3 illustrates an exploded view of a database creation module of FIG. 2 according to an embodiment herein.

FIG. 3 illustrates an exploded view of a database creation module 204 of FIG. 2 according to an embodiment herein. The database creation module 204 includes a data warehouse interface providing module 302 and a base currency determination module 304. The data warehouse interface providing module 302 provides a data warehouse interface to enter the accounting and ancillary business information that are critical to a type of business for assessing business and collateral performance. The database 202 automatically stores the critical accounting and ancillary business information in the respective memory. The base currency determination module 304 automatically determines a base currency to represent the account receivable, the inventory, the account payable, the accruals and the treasury accounts information in the database 202.

Figure 4:
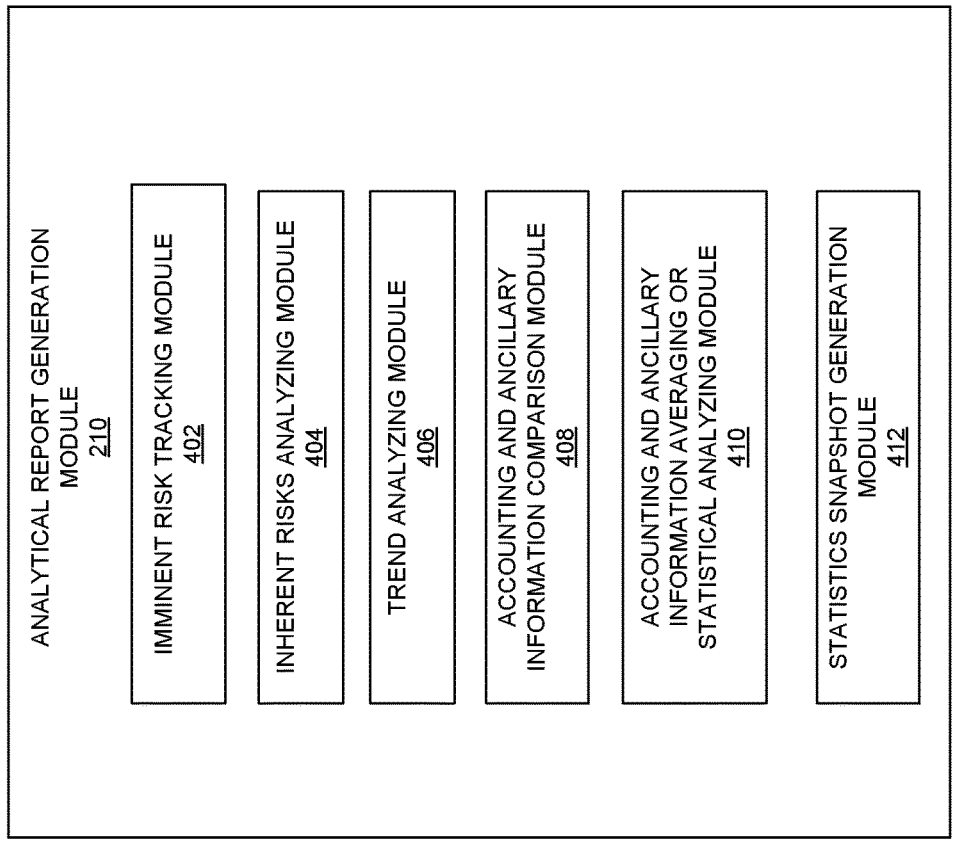
FIG. 4 illustrates an exploded view of an analytical report generation module of FIG. 2 according to an embodiment herein.

FIG. 4 illustrates an exploded view of an analytical report generation module 210 of FIG. 2 according to an embodiment herein. The analytical report generation module 210 includes an imminent risk tracking module 402, an inherent risks analyzing module 404, a trend analyzing module 406, an accounting and ancillary information comparison module 408, an accounting and ancillary information averaging or statistical analyzing module 410 and a statistics snapshot generation module 412. The imminent risks generation module 402 tracks imminent risks that are associated with the account receivable, the inventory, the account payable, the accruals and the treasury accounts information in the database 202. The inherent risks analyzing module 404 analyzes inherent risks by trending and comparing for aging, shifting in aging, reconciling items, percentages, turnover days, performance of the account receivable, performance of key and critical customers, conversion of receivable into cash and the account payable associated with the account receivable information respectively for an accounting period. The inherent risks analyzing module 404 further analyzes inherent risks by trending and comparing for aging, shifting in aging, reconciling items, percentages, turnover days, performance of the account payable and the accruals respectively for the accounting period. The trend analyzing module 406 further analyzes a trend and comparison for categories, locations, reconciling items, turnover days, percentages of inventory categories associated with the inventory perpetual for the accounting period. The accounting and ancillary information comparison module 408 compares the accounting and ancillary business information associated with the accounting period of a current year with same accounting period of last year or years. The accounting and ancillary information averaging module 410 averages or statistically analyzes the accounting and ancillary business information of the accounting period of the current year and the last year or years. Finally, the analytical report generation module 210 generates an analytical report based on the trends, comparison of the accounting and ancillary business information with comparable prior periods based on a type and seasonality of the business and averaging or statistically analyzing of the accounting and ancillary business information. In an embodiment, the seasonality of the business is different and sale, AR, AP and inventory balances that may be subject to seasonal swings based on the nature of the business.

The statistics snapshot generation module 412 generates a snapshot of statistics of the accounting and ancillary business information associated with (a) the plurality of customers based on business volume, credit terms, a credit limit, an account receivable (AR) insurance limit, a longevity of business relationship, a type of customers business, a classification of the customers, a business location, a recent dated credit rating, AR balances from the customers who are critical for the business during recent accounting periods, a percentage AR from concentration accounts (i.e. a key or critical customers with reference to the AR) to a percentage AR of total business, changes or trends in the business volume and outstanding balances at recent accounting period compared to selected prior accounting periods, average AR balances, sales and collections from the critical customers during the accounting period, wherein periodical performance and the average AR balances from the critical customers of the selected prior accounting period are compared with the recent accounting period, (b) the plurality of vendors based on business volume, credit terms, a credit limit, a longevity of business relationship, a type of their business, a classification of the vendors, a business location, account payable (AP) balances from the customers who are critical for the business during recent accounting periods, a percentage AP from concentration accounts to a percentage AP of total business, changes or trends in the business volume and outstanding balances at recent accounting period compared to selected prior accounting periods, average AP balances, purchases and payments to the critical vendors during the accounting period, wherein periodical performance and the average AP balances from the critical customers of the selected prior accounting period are compared with the recent accounting period and (c) a type, a plurality and composition of inventories based on business volume, a season of business, a type of business, a classification of the inventories, a location of the inventories that are critical for the business during the recent accounting periods, a percentage composition of critical inventory to a percentage of total business inventory, and changes or trends in the business volume and outstanding balances at recent accounting periods compared to selected prior accounting periods.

Figure 5:
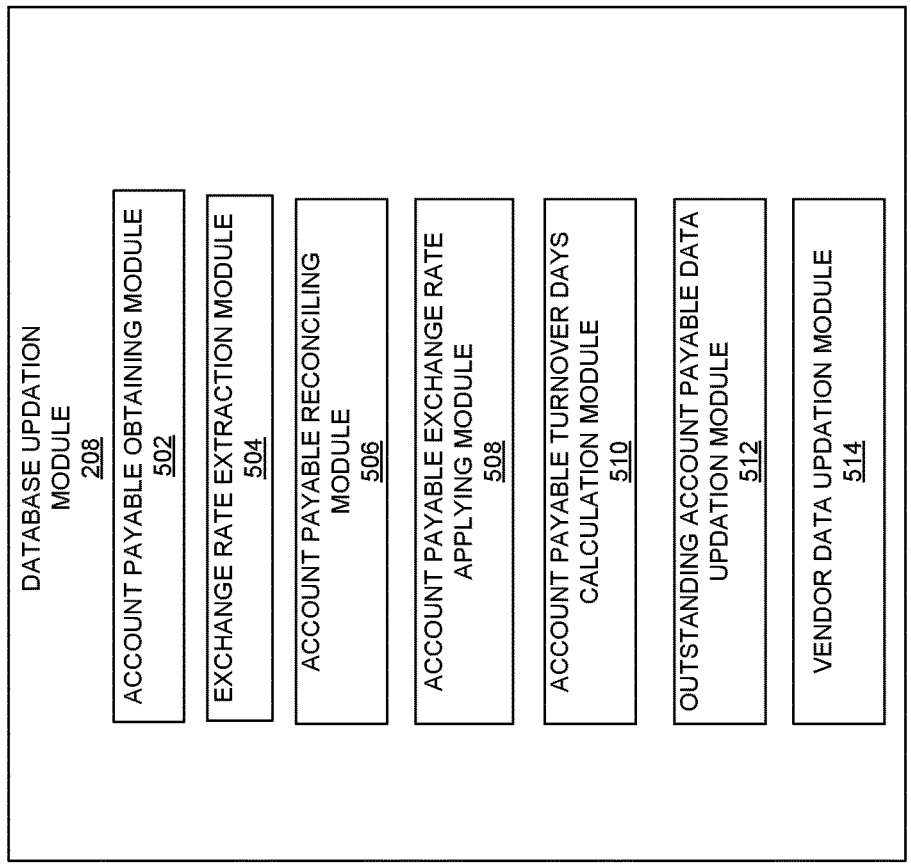
FIG. 5 illustrates an exploded view of a database updation module of FIG. 2 for updating account payable (AP) information according to an embodiment herein.

FIG. 5 illustrates an exploded view of a database updation module 208 of FIG. 2 for updating account payable (AP) information according to an embodiment herein. The database updation module 208 includes an account payable obtaining module 502, an exchange rate extraction module 504, an account payable reconciling module 506, an account payable exchange rate applying module 508, an account payable turnover days calculation module 510, an outstanding account payable data updation module 512 and a vendor data updation module 514. The account payable obtaining module 502 obtains account payable (AP) activity system reports that are relevant to each account of the GL for a recent accounting period. The exchange rate extraction module 504 extracts an exchange rate for a new accounting period which converts foreign AP from the database 202 based on the covenants at the recent accounting period. The account payable reconciling module 506 reconciles AP sub-ledger balance of the recent accounting period with the plurality of accounts in the GL and AP accruals in the balance sheet for a current accounting period. The account payable exchange rate applying module 508 applies the exchange rate for converting the foreign AP into base currency AP. The account payable turnover days calculation module 510 calculates AP turnover days by analyzing the AP activity system reports. Finally, the database updation module 208 updates the database 202 with the AP sub-ledger balance for evaluation, reconciliation and for generating customizable analytical reports.

The account payable obtaining module 502 obtains account payable (AP) activity summary reports that are relevant to each account of the GL for a recent accounting period. The account payable reconciling module 506 reconciles AP activity data of the recent accounting period, with reference to a type or category of transactions based on the AP activity summary reports related to each account of the GL, for a current accounting period. The AP activity data may include overall purchases, payments made and the resultant turnover days. The type or category of the transactions includes at least one of (a) gross purchases, (b) account debits or (c) cash or any adjustments posted to the AP. The account payable turnover days calculation module 510 calculates AP turnover days by analyzing the AP activity summary reports. The database updation module 208 updates the database 202 with the AP activity data for evaluation, reconciliation and for generating customizable analytical reports.

The account payable obtaining module 502 further obtains a summary of account payable (AP) outstanding and aging relevant to each critical vendor for a recent accounting period. The outstanding account payable data updation module 512 updates outstanding AP data for each critical vendor of the recent accounting period for a current accounting period. The account payable turnover days calculation module 510 calculates overall AP turnover days related to vendor payouts for the recent accounting period. The vendor data updation module 514 updates vendor data including a vendor location, a type of vendor business, terms provided, credit limit for the current accounting period. Finally, the database updation module 208 updates the database 202 with the outstanding AP data for evaluation, reconciliation and for generating customizable analytical reports.

Figure 6:
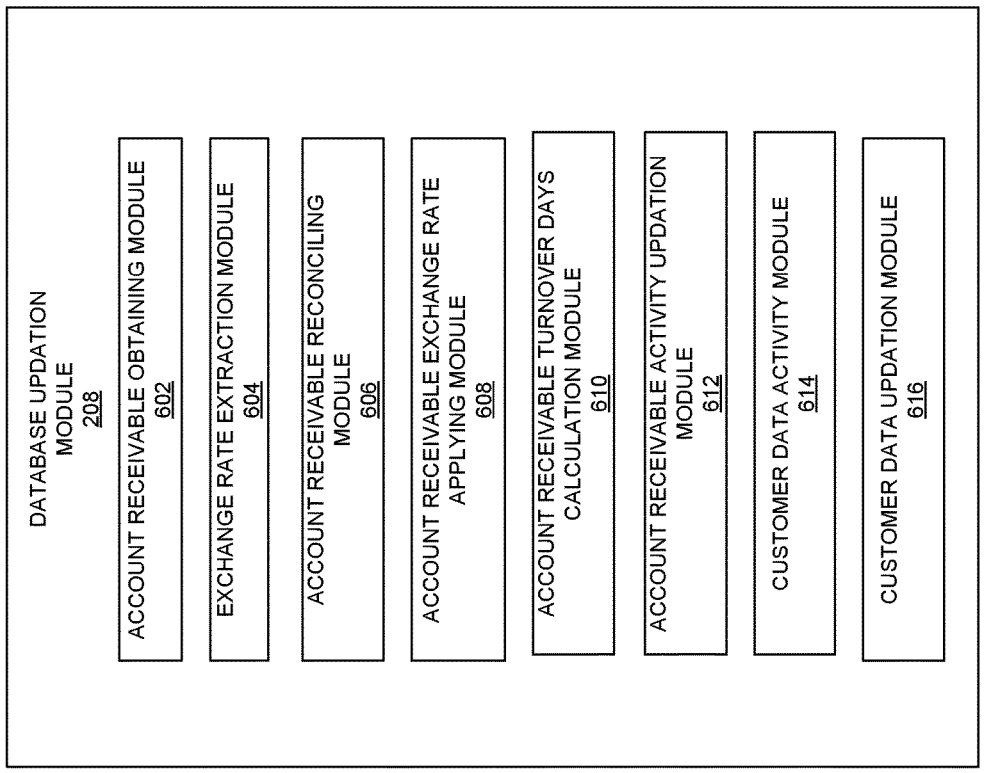
FIG. 6 illustrates an exploded view of the database updation module of FIG. 2 for updating account receivable (AR) information according to an embodiment herein.

FIG. 6 illustrates an exploded view of the database updation module 208 of FIG. 2 for updating account receivable (AR) information according to an embodiment herein. The database updation module 208 includes an account receivable obtaining module 602, an exchange rate extraction module 604, an account receivable reconciling module 606, an account receivable exchange rate applying module 608, an account receivable turnover days calculation module 610 and an account receivable activity updation module 612. The account receivable obtaining module 602 obtains account receivable (AR) activity reports that are relevant to each loan ledger and each account in the GL for a recent accounting period. The exchange rate extraction module 604 extracts an exchange rate which converts foreign AR collateral based on covenants, the loan ledger of the recent accounting period for a current accounting period. The account receivable reconciling module 606 reconciles AR sub-ledger balance that are relevant to each loan ledger of the recent accounting period with the plurality of accounts of the GL, and in the balance sheet for the current accounting period. The account receivable exchange rate applying module 608 applies the exchange rate at the recent accounting period end for converting from the foreign AR to base currency AR. The account receivable turnover day's calculation module 610 calculates AR turnover days by analyzing the relevant AR activity reports. The database updation module 208 updates the database 202 with the AR sub-ledger balance for evaluation, reconciliation and for generating customizable analytical reports.

The account receivable obtaining module 602 further obtains account receivable (AR) activity summary reports that are relevant to each loan ledger and each account of the GL for a recent accounting period end. The account receivable reconciling module 606 further reconciles AR activity data of the recent accounting period, with reference to a type or category of transactions based on the AR activity summary reports related to each loan ledger and each account of the GL, for a current accounting period. The AR activity data may include overall sales, payments received, credits given or adjustment posted and the resultant turnover days. The type or category of the transactions includes at least one of (a) gross sales, (b) dilutive or non-dilutive credits issued or (c) cash collected for any adjustments posted to the AR. The account receivable turnover days calculation module 610 calculates AR turnover days and dilution in percentage by analyzing the AR activity summary reports. The database updation module 208 updates the database with the AR activity data for evaluation, reconciliation and for generating customizable analytical reports.

The database updation module 208 further includes a customer data activity module and a customer data updation module. The customer data activity module stores information related to a critical customer. The account receivable obtaining module 602 further obtains account receivable (AR) activity summary data with ending balance relevant to each critical customer for a recent accounting period. The account receivable activity updation module 612 updates the AR activity related to each critical customer of the recent accounting period for a current accounting period, with reference to a type or categories of transactions based on the AR activity summary data. The account receivable turnover days calculation module 610 calculates AR turnover days by analyzing the AR activity summary data. The customer data updation module updates customer data including a customer location, a type of customer business, terms provided, credit limit and credit insurance limit. The database updation module 208 further updates the database 202, with the customer data, for evaluation, reconciliation and for generating customizable analytical reports for the current accounting period.

The exchange rate extraction module 604 further extracts (a) cash received from the AR activity data relevant to each loan ledger and each account of the GL for the recent accounting period and (b) cash received from non-AR activity. The account receivable reconciling module 606 further reconciles AR-treasury reconciliation data including the cash received from (a) the AR activity data for the current accounting period and (b) the non-AR activity with deposits in a designated account of the GL and the loan ledger for the current accounting period. In an embodiment, payments in each accounting period are routed through the designated account of the GL. The designated account of the GL performs for each currency where the business includes the operating accounts. In another embodiment, when an accounting period ends, balances are expected to reconcile with breakdown of variances for outstanding transactions to confirm that the outstanding transactions at the accounting period end are not bulging or are being held. The database updation module 208 further updates the database 202 with the AR-treasury reconciliation data for evaluation, reconciliation and for generating customizable analytical reports.

Figure 7:
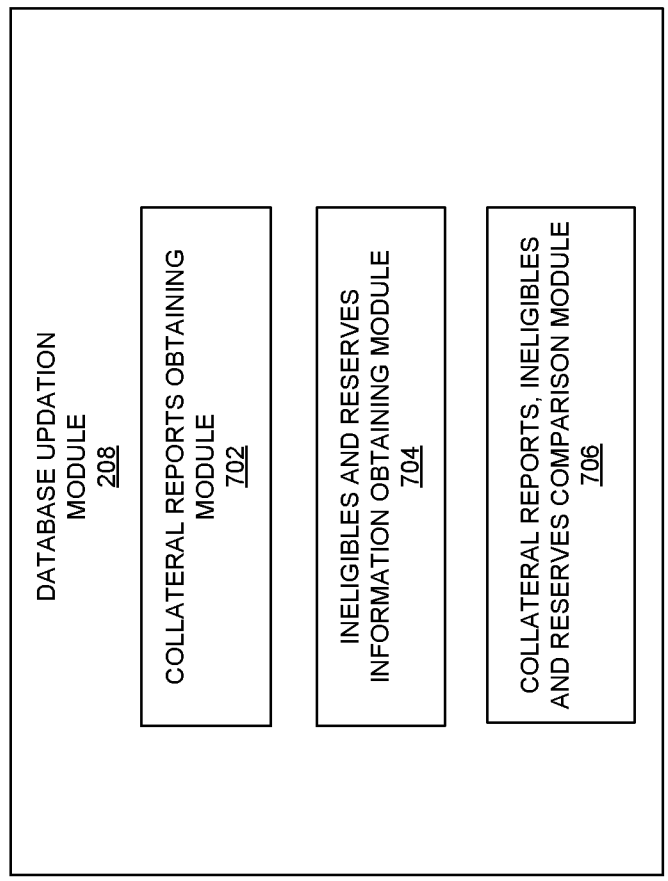
FIG. 7 illustrates an exploded view of the database updation module of FIG. 2 for updating collateral reports, ineligible collateral and reserves according to an embodiment herein.

FIG. 7 illustrates an exploded view of the database updation module 208 of FIG. 2 for updating the collateral reports, ineligible collateral and reserves according to an embodiment herein. The database updation module 208 includes a collateral reports obtaining module 702, an ineligibles and reserves information obtaining module 704 and a collateral reports, and ineligibles and reserves comparison module 706. The collateral reports obtaining module 702 obtains collateral reports relevant to each loan ledger and each account of the GL for a recent accounting period. The ineligibles and reserves information obtaining module 704 obtains ineligibles and reserves at a current account period for each collateral component based on the covenants relevant to each loan ledger at the recent accounting period. The collateral, ineligibles and reserves comparison module 706 compares the collateral, ineligibles and the reserves in each loan ledger for the recent accounting period with new ineligibles and reserves that are received from the business in the database 202. The ineligibles and reserves information obtaining module 704 further obtains updated balances of the ineligibles and the reserves of the current accounting periods in the respective loan ledger corresponding to the respective account of the GL in the database 202. The database updation module 208 further updates the database 202 with the updated balances of the ineligibles and the reserves for evaluation, reconciliation and for generating customizable analytical reports. In an embodiment, the ineligibles and reserves that are newly obtained are incorporated in the respective loan ledger and respective account of the GL when the new ineligibles and reserves are compared to the ineligibles and the reserves of the recent accounting period. The ineligibles and reserves information obtaining module 704 further obtains a type of the new ineligibles and reserves that are reported, not reported and compared to prior accounting periods to assess an impact of the new ineligibles and reserves on the collaterals of the lender or stakeholders.

Figure 8:
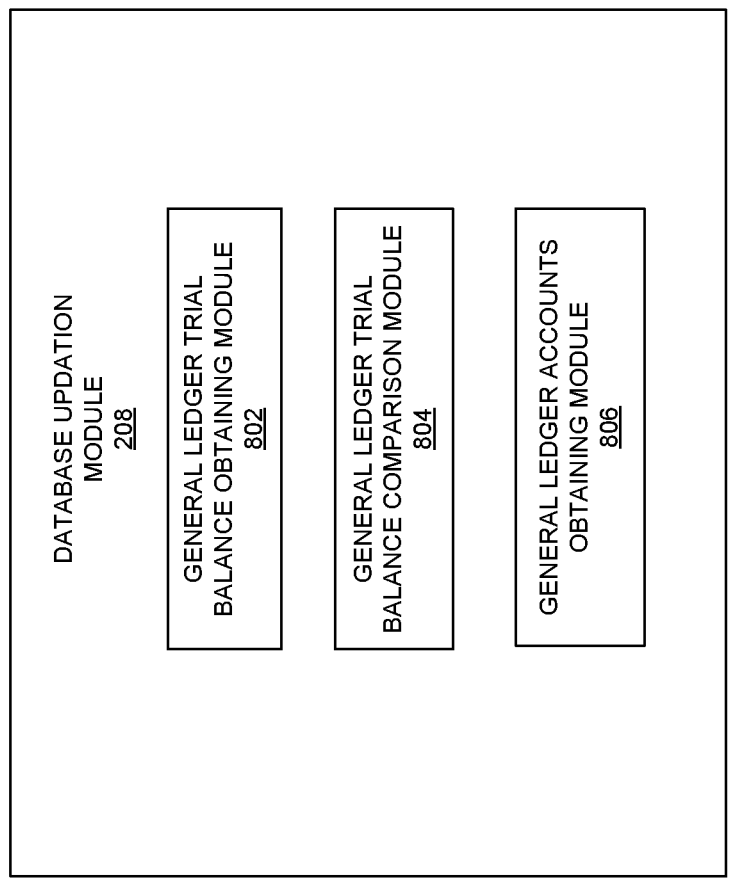
FIG. 8 illustrates an exploded view of the database updation module of FIG. 2 for updating a general ledger trial balance according to an embodiment herein.

FIG. 8 illustrates an exploded view of the database updation module 208 of FIG. 2 for updating a general ledger trial balance according to an embodiment herein. The database updation module 208 includes a general ledger trial balance obtaining module 802, a general ledger trial balance comparison module 804 and a general ledger accounts obtaining module 806. The general ledger trial balance obtaining module 802 extracts a GL trail balance for a recent accounting period. The general ledger trial balance comparison module 804 compares the GL trial balance of the recent accounting period with a GL trial balance in the database 202. The general ledger trial balance obtaining module 802 further extracts updated balances of the GL trial balance for the current accounting period in balance sheet accounts corresponding to groupings and each account of the GL in the database 202. In an embodiment, each account of the GL is sequenced as the account of the GL is grouped in the balance sheet. The database updation module 208 updates the database 202 for evaluation, reconciliation and for generating customizable analytical reports using updated balances of the GL trial balance. In an embodiment, GL accounts that are newly determined are added to the database 202 with reference to balance sheet groupings and each account of the GL. The general ledger accounts obtaining module 806 extracts a type of the new GL accounts to add the new GL accounts to assess an impact on the collaterals of the lender or stakeholders.

Figure 9:
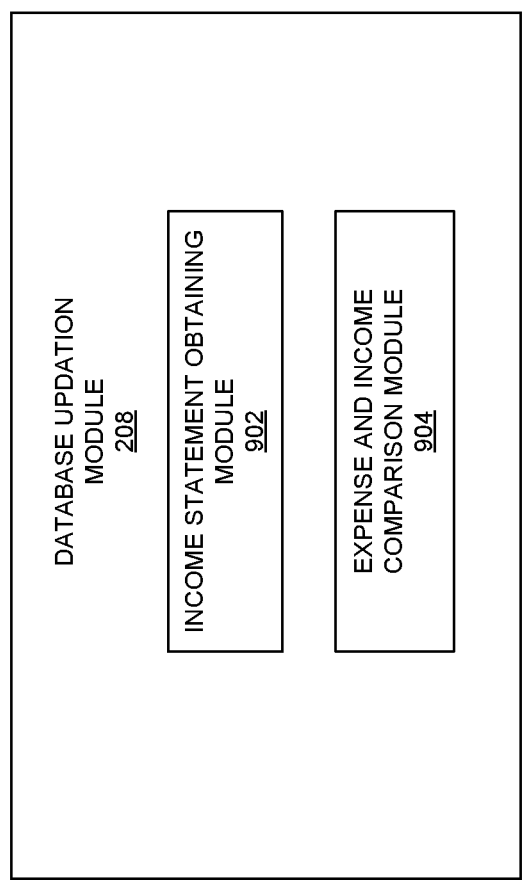
FIG. 9 illustrates an exploded view of the database updation module of FIG. 2 for updating an income statement according to an embodiment herein.

FIG. 9 illustrates an exploded view of the database updation module 208 of FIG. 2 for updating an income statement according to an embodiment herein. The database updation module 208 includes an income statement obtaining module 902 and an expense and income comparison module 904. The income statement obtaining module 902 extracts an income statement for each category of expense and income for a recent accounting period. The expense and income comparison module 904 compares the expenses and income for the recent accounting period within the database 202. The income statement obtaining module 902 further extracts updated balances of the income and expense for the current accounting periods with reference to groupings in the database 202. The database updation module 208 updating the database 202 for evaluation, reconciliation and for generating customizable analytical reports using the updated balances of the income and expense. The income statement obtaining module 902 further extracts a type of new income and expense to assess an impact of the new income and expense heads on the collaterals of the lender or stakeholders.

Figure 10:
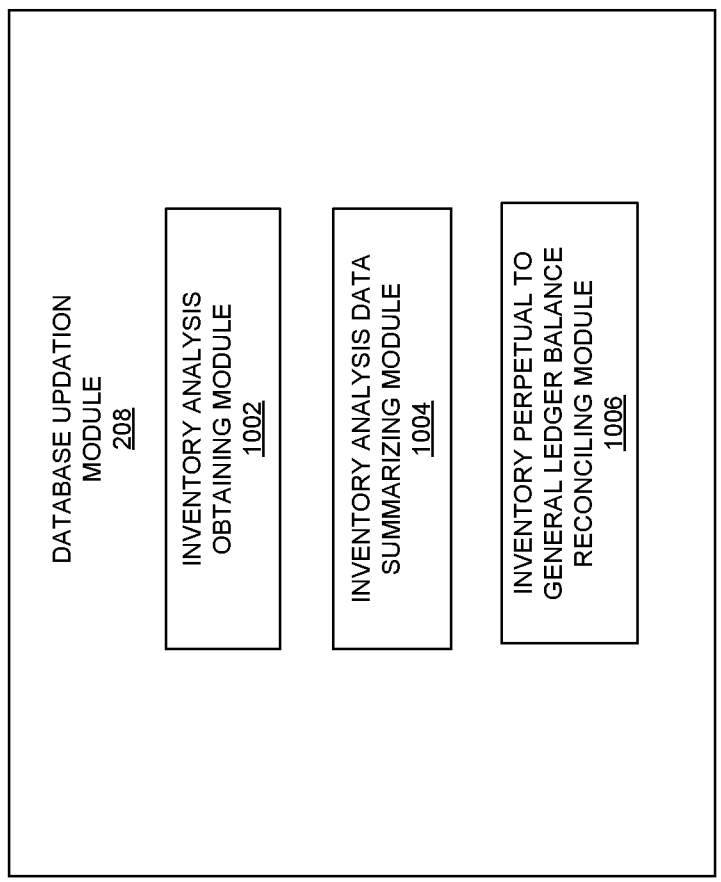
FIG. 10 illustrates an exploded view of the database updation module of FIG. 2 for updating an inventory analysis according to an embodiment herein.

FIG. 10 illustrates an exploded view of the database updation module 208 of FIG. 2 for updating an inventory analysis according to an embodiment herein. The database updation module 208 includes an inventory analysis obtaining module 1002, an inventory analysis data summarizing module 1004 and an inventory perpetual to general ledger balance reconciling module 1006. The inventory analysis obtaining module 1002 extracts current accounting period inventory analysis or a summary relevant to each account of the GL and loan ledger for a recent accounting period. In an embodiment, the inventory analysis or the summary relevant to each account of the GL includes at least one of details of category, sub-category, a location or eligibility. The inventory analysis data summarizing module 1004 summarizes current accounting period inventory analysis data including inventory ineligibles corresponding to at least one of the details of category, the sub-category, the location or the eligibility. The inventory perpetual to general ledger balance reconciling module 1006 reconciles inventory with each of the loan ledger, each account of the GL and various inventory databases for the recent accounting period. The database updation module 208 updates the database 202 for evaluation, reconciliation and for generating customizable analytical reports using inventory analysis data.

Figure 11:
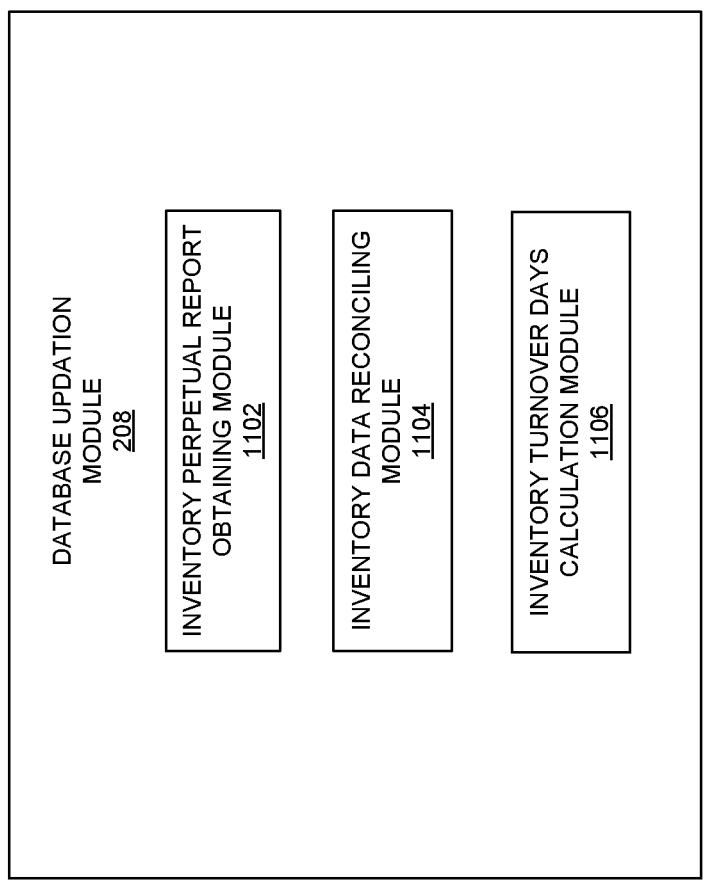
FIG. 11 illustrates an exploded view of the database updation module of FIG. 2 for updating an inventory perpetual report according to an embodiment herein.

FIG. 11 illustrates an exploded view of the database updation module 208 of FIG. 2 for updating an inventory perpetual report according to an embodiment herein. The database updation module 208 includes an inventory perpetual report obtaining module 1102, an inventory data reconciling module 1104 and an inventory turnover days calculation module 1106. The inventory perpetual report obtaining module 1102 extracts inventory perpetual reports relevant to each account of the GL and the loan ledger for a recent accounting period. In an embodiment, the database 202 is generated for each type of inventory when the business includes more than one inventory. In an embodiment, the stakeholders analyze a new general ledger account to evaluate, in case of risk, when the new general ledger account is added or deleted. In an embodiment, the inventory ineligibles are tracked with reference to stipulated parameters and applicable criteria and advance rate. The stipulated parameters may include work in progress, packaging or consumables inventory, inventory sent or received on consignment, customer or vendor owned inventory, reserves for costing or test counts, aged or stale inventory, unusable or obsolete inventory etc. The inventory data reconciling module 1104 reconciles inventory from the inventory perpetual reports with accounts of the GL, various inventory reserves and a balance sheet for the recent accounting period. The extracted current accounting period information associated with the one or more of accounts, the one or more of collateral accounts, the one or more of customers, the inventories and the one or more of vendors are automatically processed to correct data extraction errors using a quality control system. The one or more parameters from the extracted current accounting period information associated with the one or more of accounts, the one or more of collateral accounts, the one or more of customers, the inventories and the one or more of vendors are automatically determined by analyzing the current accounting period information using a data analysis technique. The one or more parameters includes at least one of opening balance, gross sales, cash received, cash paid, turnover, discounts, credits, receivables, general ledger balance, variance, dilution, cost of sales, expenses, profit, loss, bad debts, or tax. The inventory perpetual reports are system generated inventory status reports as of a particular date. The inventory turnover days calculation module 1106 calculates inventory turnover days using cost of goods sold in income statement data. The database updation module 208 updates the database 202 for evaluation and generating customizable analytical reports using the inventory reconciliation data. In an embodiment, the database 202 allows the stakeholder to analyze through inventory values at each location with reference to eligibility. In another embodiment, the database 202 for analysis of the inventory turnover for each key category is generated. The database 202 allows the stakeholder to have an assessment on how each segment/type of inventory is performing on a period to period basis.

Figure 12:
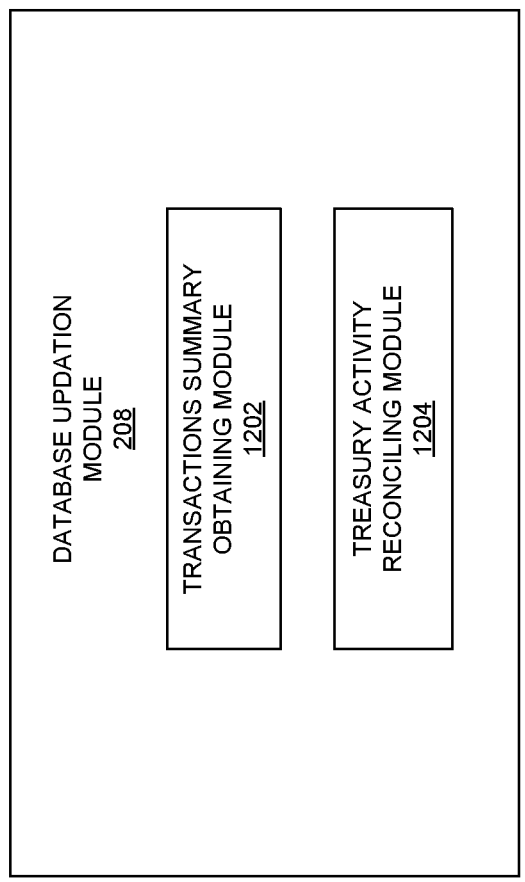
FIG. 12 illustrates an exploded view of the database updation module of FIG. 2 for updating a transaction summary according to an embodiment herein.

FIG. 12 illustrates an exploded view of the database updation module 208 of FIG. 2 for updating a transaction summary according to an embodiment herein. The database updation module 208 includes a transactions summary obtaining module 1202 and a treasury activity reconciling module 1204. The transactions summary obtaining module 1202 obtains summary of transactions including debits and credits from transactions summary of each of operating and loan bank accounts linked to a designated GL for a recent accounting period. The treasury activity reconciling module 1204 reconciles treasury activity data including debits and credits for the recent accounting period corresponding to deposits and withdrawals in a designated bank account in the GL for a current accounting period. The database updation module 208 updates the database 202 for evaluation, reconciliation and for generating customizable analytical reports using the treasury activity data.

Figure 13:
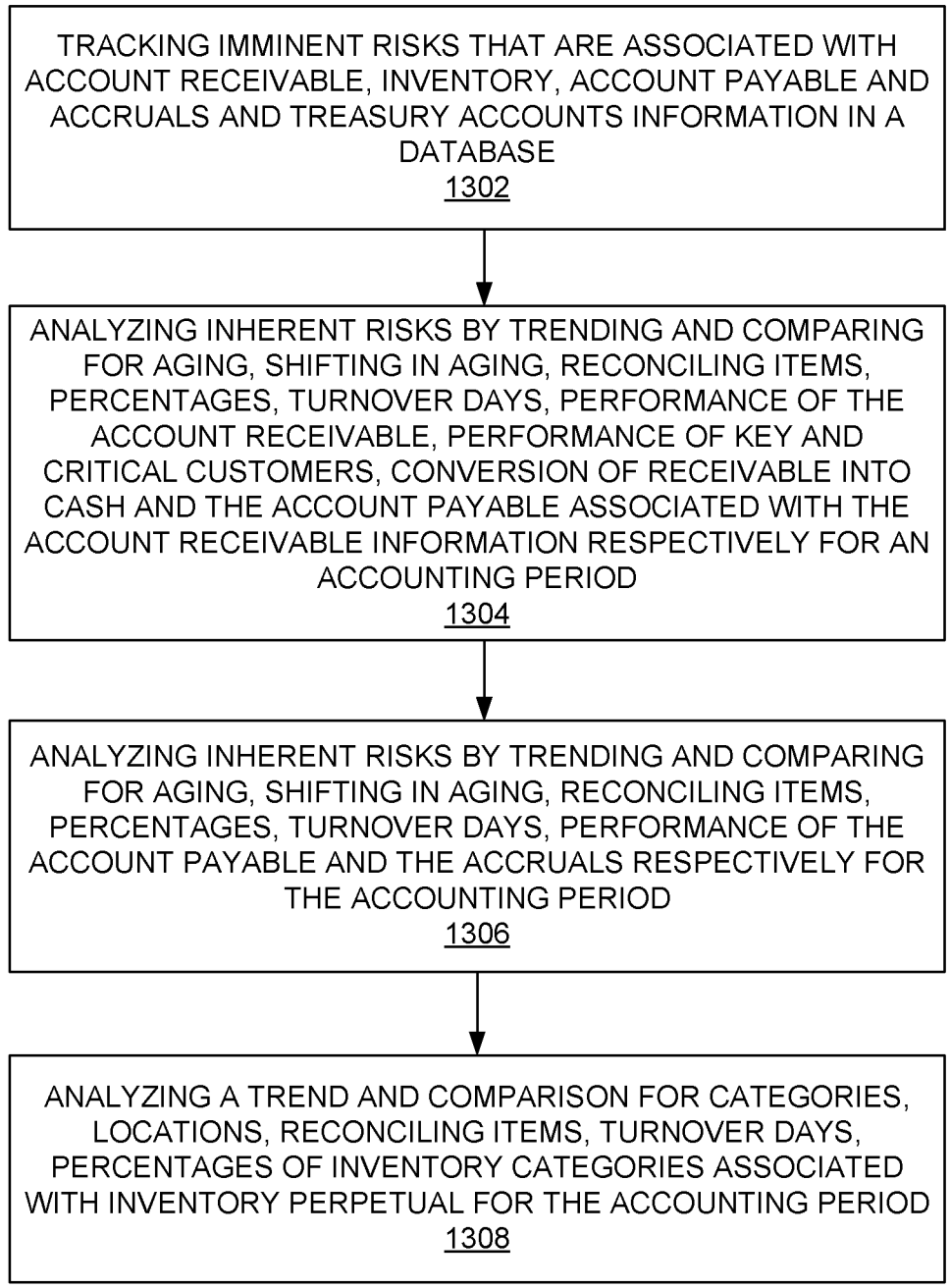
FIG. 13 is a flow diagram that illustrates a method for generating of analytical report for assessing the collateral risk and the business performance according to an embodiment herein.

FIG. 13 is a flow diagram that illustrates a method for generating of customizable analytical report for assessing the collateral risk and the business performance according to an embodiment herein. At step 1302, imminent risks associated with account receivable, inventory, account payable and accruals, and the treasury accounts information are tracked in the database 202. At step 1304, inherent risks are analyzed by trending and comparing for aging, shifting in aging, reconciling items, percentages, turnover days, performance of the account receivable, performance of key and critical customers, conversion of receivable into cash and the account payable associated with the account receivable information respectively for an accounting period. At step 1306, the inherent risks are analyzed by trending and comparing for aging, shifting in aging, reconciling items, percentages, turnover days, performance of the account payable and the accruals respectively for the accounting period. At step 1308, a trend and comparison for categories, locations, reconciling items, turnover days, percentages of inventory categories associated with the inventory perpetual are analyzed for the accounting period.

Figure 14:
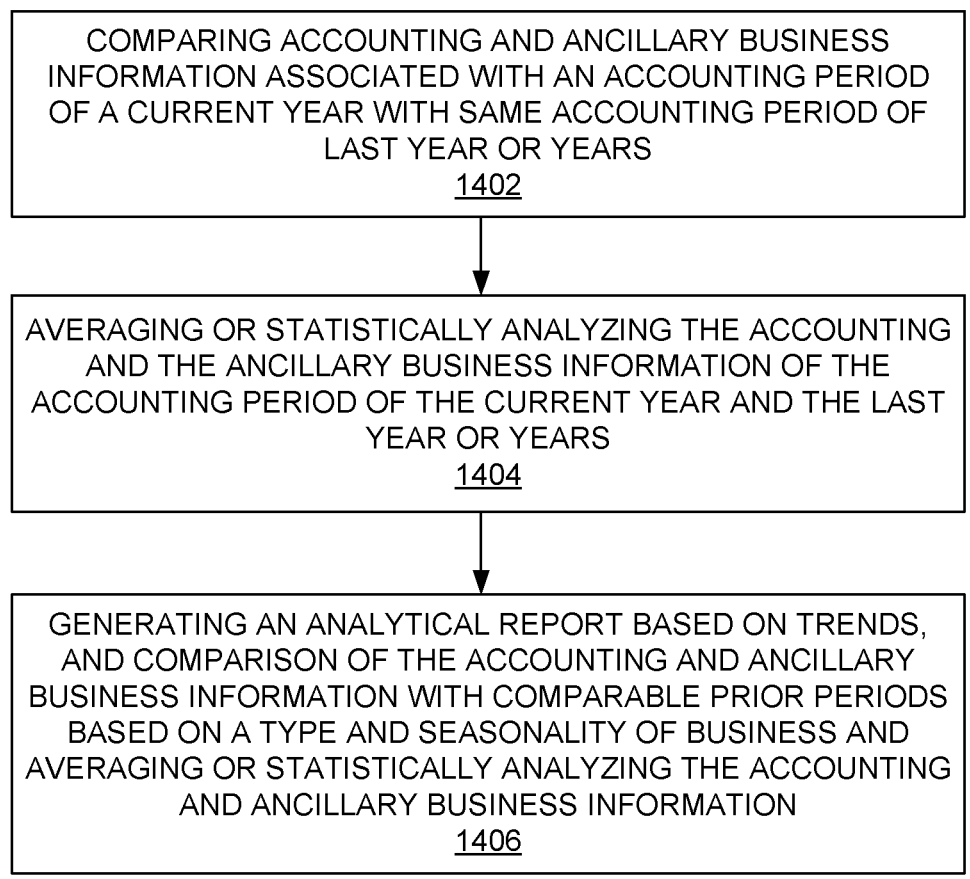
FIG. 14 is a flow diagram that illustrates a method for generating of analytical report based on comparison of accounting and ancillary business information associated with comparable prior periods according to an embodiment herein.

FIG. 14 is a flow diagram that illustrates a method for generating of analytical report based on comparison of accounting and ancillary business information associated with comparable prior periods according to an embodiment herein. At step 1402, accounting and ancillary business information associated with accounting period of a current year is compared with same accounting period of last year or years. At step 1404, the accounting and ancillary business information of the accounting period of the current year and the last year or years is averaged or statistically analyzed. At step 1406, an analytical report is generated based on trends, comparison of the accounting and ancillary business information with comparable prior periods based on a type and seasonality of the business and averaging or statistically analyzing of the accounting and ancillary business information.

Figure 15:
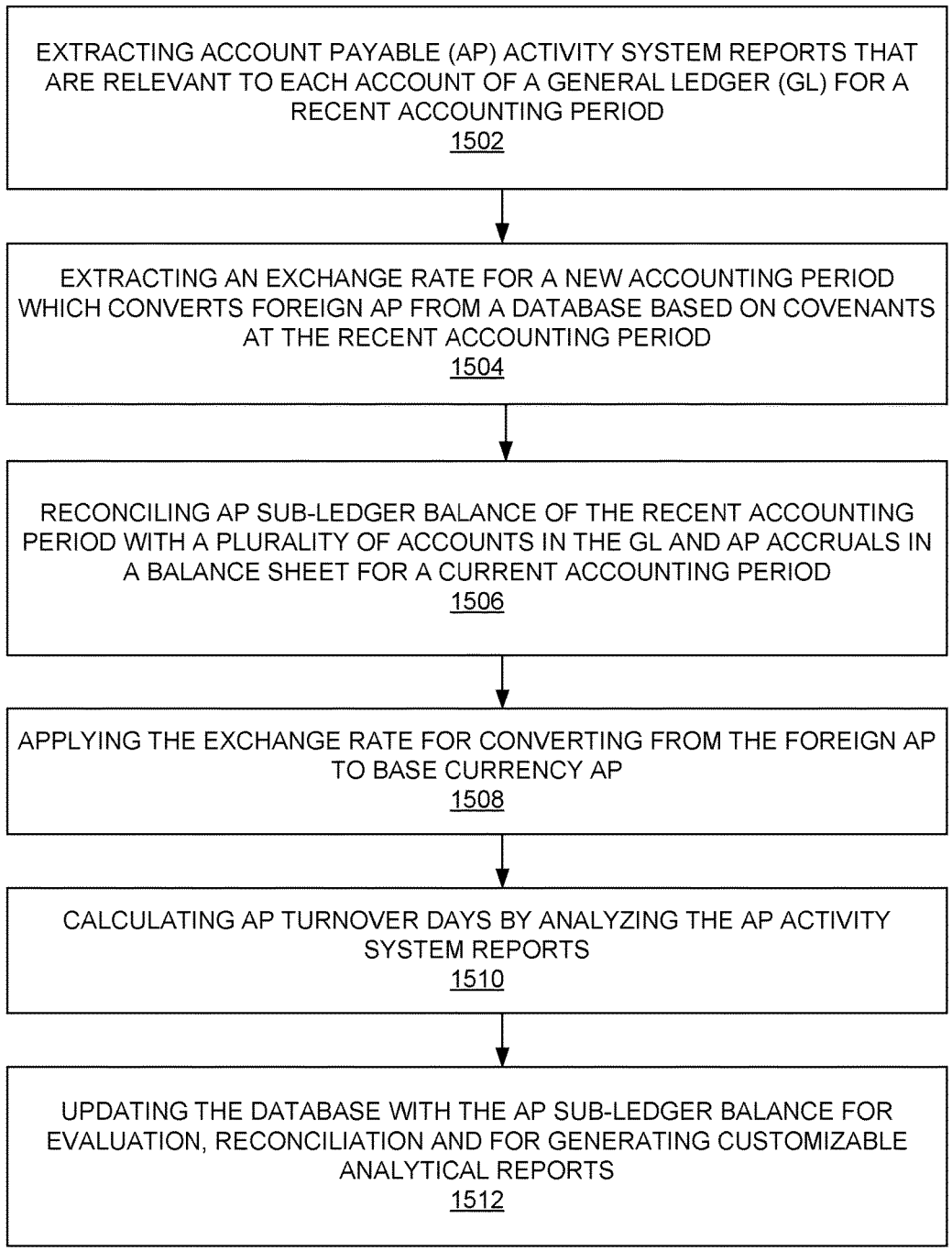
FIG. 15 is a flow diagram that illustrates a method of updating a database with account payable (AP) sub-ledger balance according to an embodiment herein.

FIG. 15 is a flow diagram that illustrates a method of updating a database 202 with account payable (AP) subledger balance according to an embodiment herein. At step 1502, account payable (AP) activity system reports that are relevant to each account of a general ledger (GL) for a recent accounting period are extracted. At step 1504, an exchange rate is extracted for a new accounting period which converts foreign AP from the database 202 based on covenants at the recent accounting period. At step 1506, AP sub-ledger balance of the recent accounting period is reconciled with the plurality of accounts of the GL and AP accruals in the balance sheet for a current accounting period. At step 1508, the exchange rate is applied for converting from the foreign AP to base currency AP. At step 1510, AP turnover days are calculated by analyzing the AP activity system reports. At step 1512, the database 202 is updated with the AP subledger balance for evaluation, reconciliation and for generating customizable analytical reports.

Figure 16:
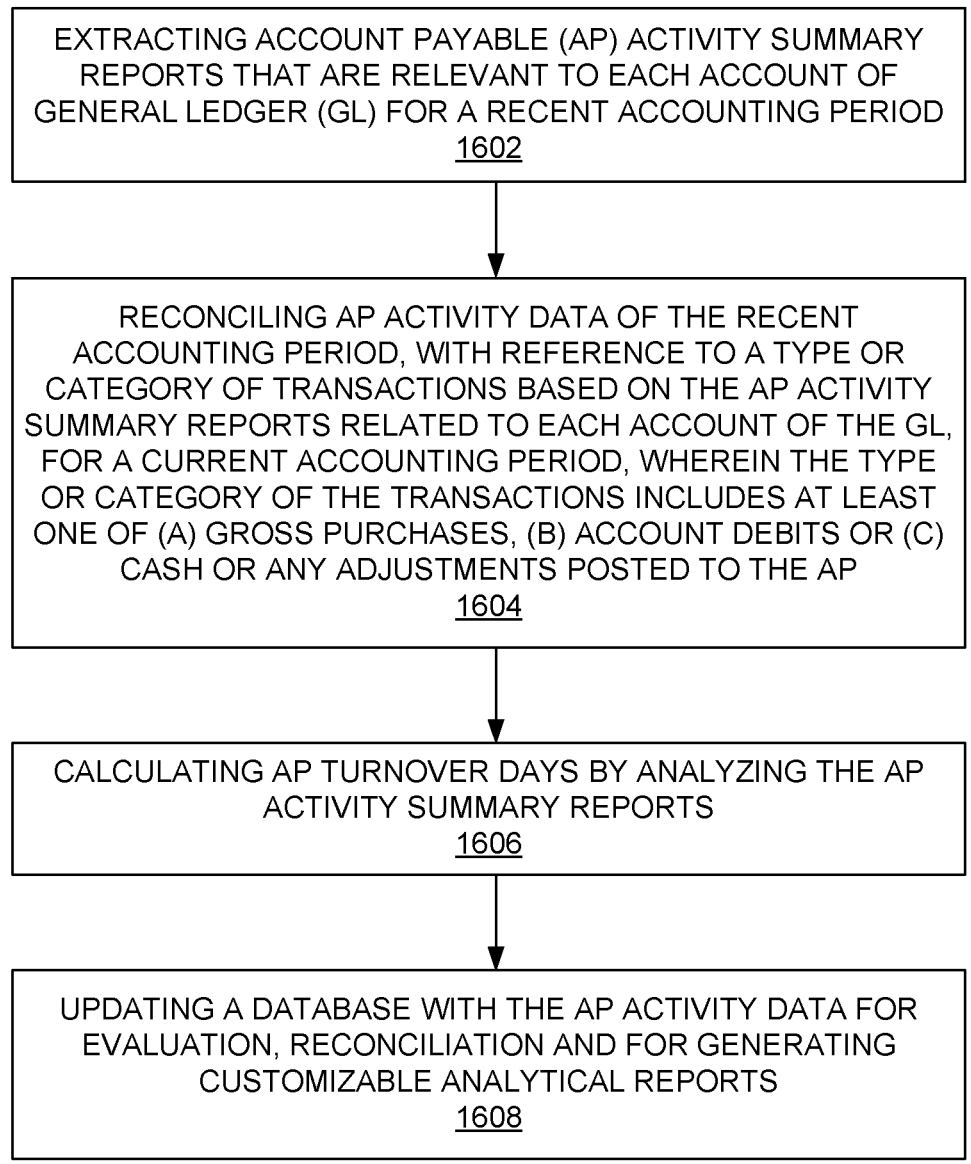
FIG. 16 is a flow diagram that illustrates a method of updating the database with account payable (AP) activity data according to an embodiment herein.

FIG. 16 is a flow diagram that illustrates a method of updating the database 202 with account payable (AP) activity data according to an embodiment herein. At step 1602, account payable (AP) activity summary reports that are relevant to each account of GL for a recent accounting period is extracted. At step 1604, AP activity data of the recent accounting period is reconciled with reference to a type or category of transactions based on the AP activity summary reports related to each account of the GL, for a current accounting period. The AP activity data may include overall purchases, payments made and the resultant turnover days. In an embodiment, the type or category of the transactions includes at least one of (a) gross purchases, (b) account debits or (c) cash or any adjustments posted to the AP. At step 1606, AP turnover days are calculated by analyzing the AP activity summary reports. At step 1608, the database 202 is updated with the AP activity data for evaluation, reconciliation and for generating customizable analytical reports.

Figure 17:
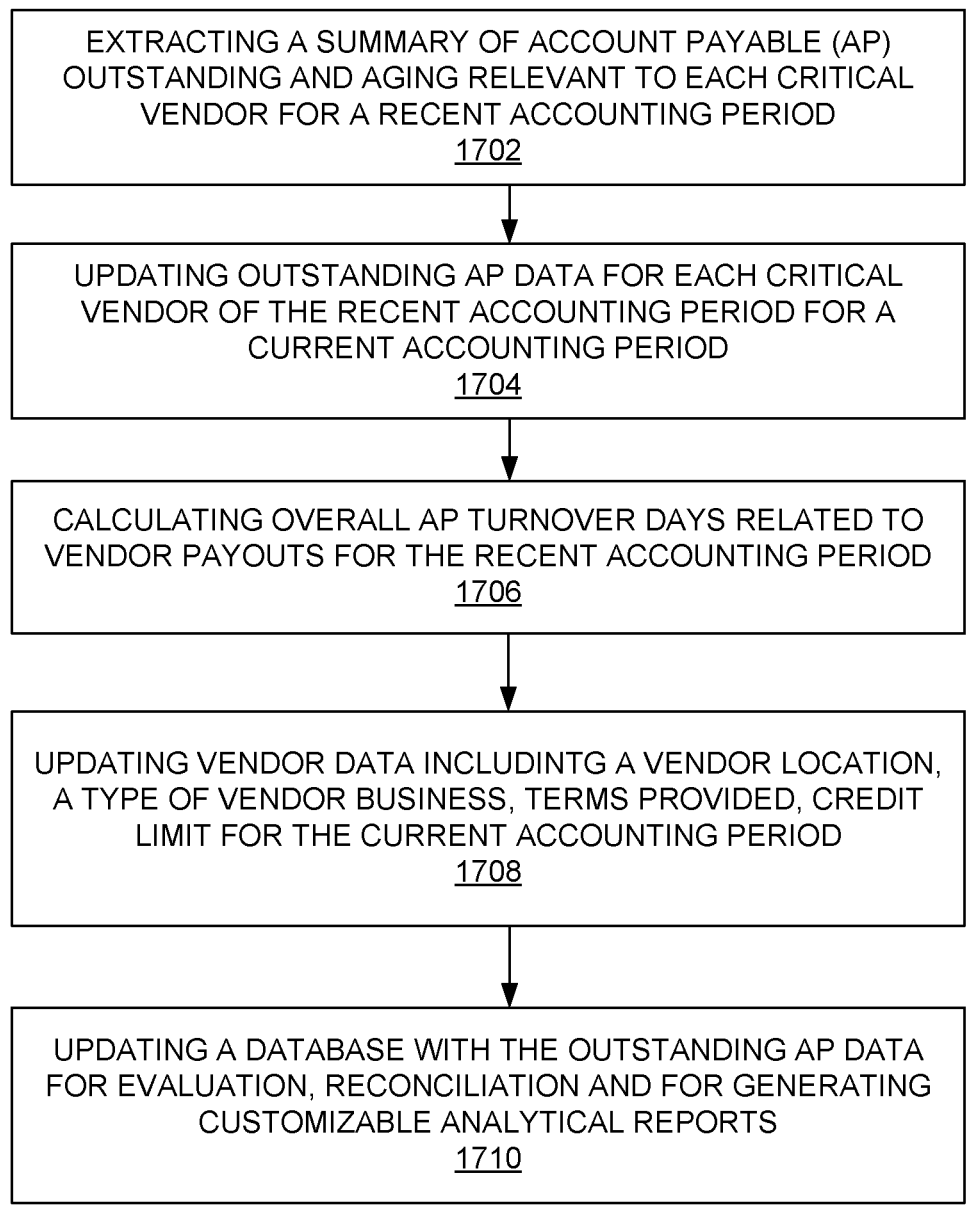
FIG. 17 is a flow diagram that illustrates a method of updating the database with outstanding account payable (AP) data according to an embodiment herein.

FIG. 17 is a flow diagram that illustrates a method of updating the database 202 with outstanding account payable (AP) data according to an embodiment herein. At step 1702, a summary of account payable (AP) outstanding and aging relevant to each critical vendor for a recent accounting period is extracted. At step 1704, outstanding AP data for each critical vendor of the recent accounting period for a current accounting period is updated. At step 1706, overall AP turnover days related to vendor payouts for the recent accounting period are calculated. At step 1708, vendor data including a vendor location, a type of vendor business, terms provided, credit limit for the current accounting period is updated. At step 1710, the database 202 is updated with the outstanding AP data for evaluation, reconciliation and for generating customizable analytical reports.

Figure 18:
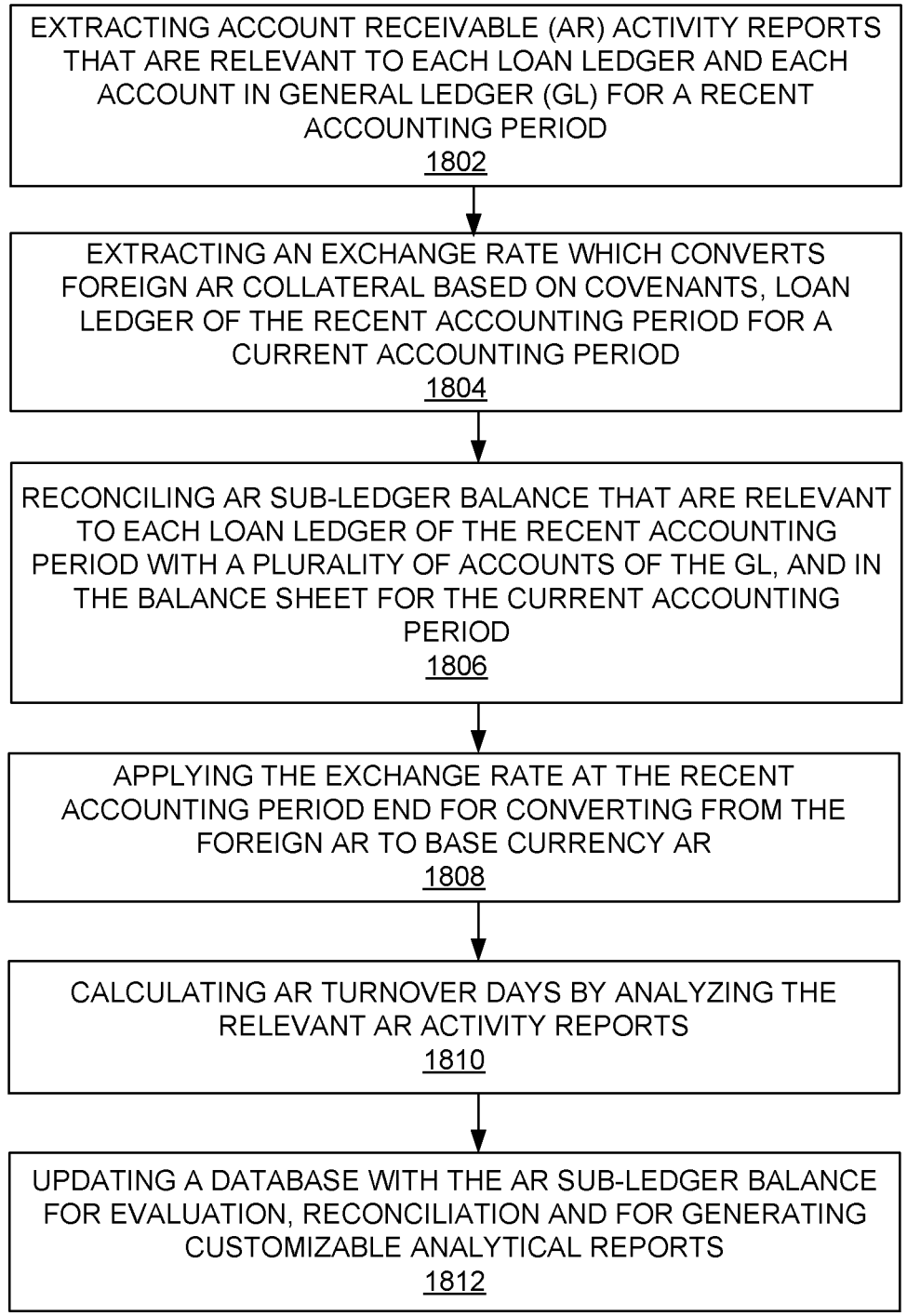
FIG. 18 is a flow diagram that illustrates a method of updating the database with account receivable (AR) sub-ledger balance according to an embodiment herein.

FIG. 18 is a flow diagram that illustrates a method of updating the database 202 with account receivable (AR) sub-ledger balance according to an embodiment herein. At step 1802, account receivable (AR) activity reports that are relevant to each loan ledger and each account in the GL for a recent accounting period are extracted. At step 1804, an exchange rate which converts foreign AR collateral based on covenants, loan ledger of the recent accounting period for a current accounting period is extracted. At step 1806, AR sub-ledger balance that are relevant to each loan ledger of the recent accounting period is reconciled with a plurality of accounts of the GL, and in the balance sheet for the current accounting period. At step 1808, the exchange rate is applied at the recent accounting end for converting from the foreign AR to base currency AR. At step 1810, AR turnover days are calculated by analyzing the relevant AR activity reports. At step 1812, the database 202 is updated with the AR sub-ledger balance for evaluation, reconciliation and for generating customizable analytical reports.

FIG. 19 is a flow diagram that illustrates a method of updating the database 202 with account receivable (AR) activity data according to an embodiment herein. At step 1902, account receivable (AR) activity summary reports that are relevant to each loan ledger and each account of GL for a recent accounting period end are extracted. At step 1904, AR activity data of the recent accounting period is reconciled with reference to a type or category of transactions based on the AR activity summary reports related to each loan ledger and each account of the GL, for a current accounting period. The AR activity data may include overall sales, payments received, credits given or adjustment posted and the resultant turnover days. The type or category of the transactions includes at least one of (a) gross sales, (b) dilutive or non-dilutive credits issued or (c) case collected for any adjustments posted to the AR. At step 1906, AP turnover days and dilution in percentage are calculated by analyzing the AR activity summary reports. At step 1908, the database 202 is updated with the AR activity data for evaluation, reconciliation and for generating customizable analytical reports.

Figure 20:
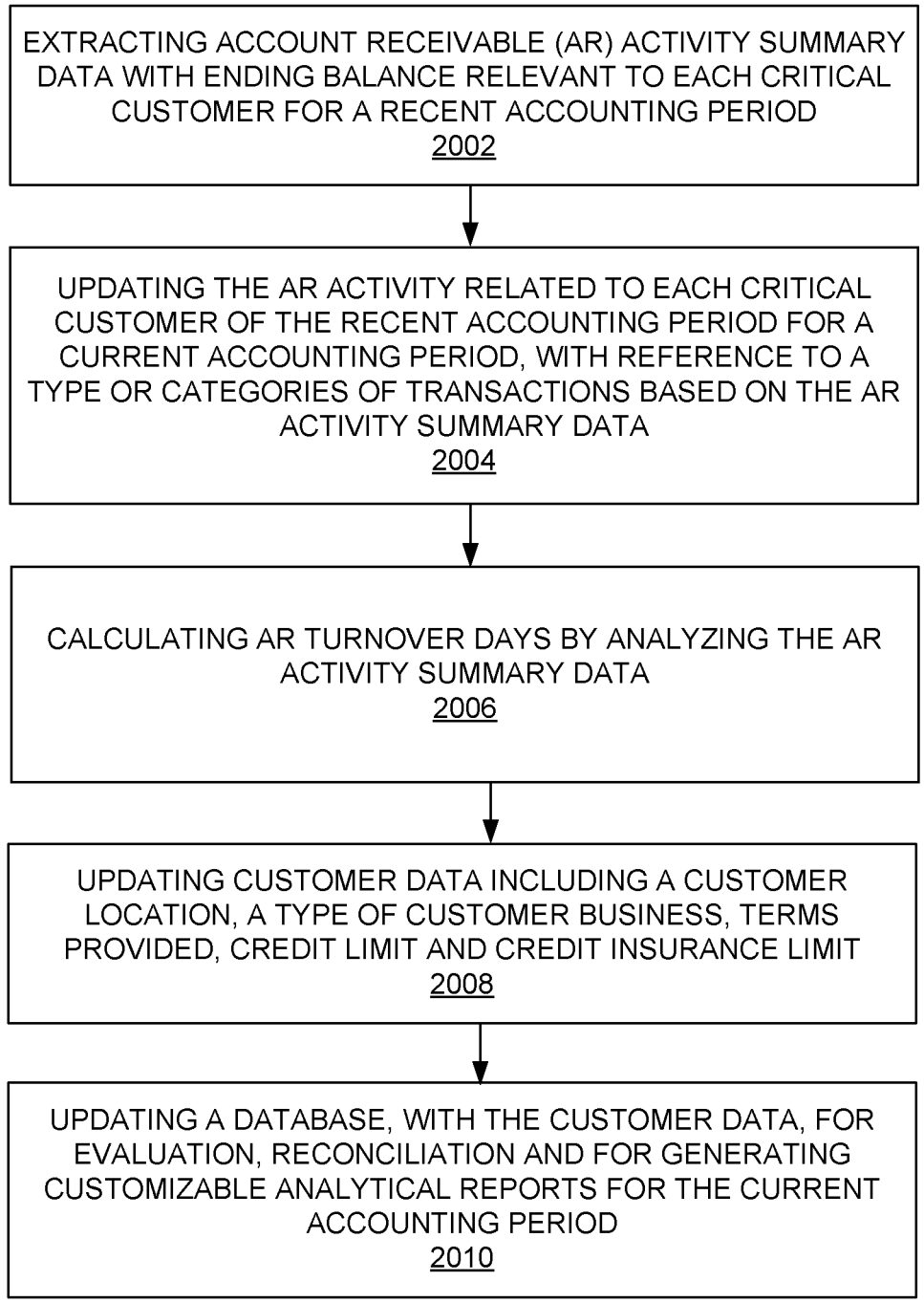
FIG. 20 is a flow diagram that illustrates a method of updating the database with customer data using the AR activity data according to an embodiment herein.

FIG. 20 is a flow diagram that illustrates a method of updating the database 202 with customer data using the AR activity data according to an embodiment herein. At step 2002, account receivable (AR) activity summary data with ending balance relevant to each critical customer for a recent accounting period is extracted. At step 2004, the AR activity related to each critical customer of the recent accounting period for a current accounting period is updated with reference to a type or categories of transactions based on the AR activity summary data. At step 2006, AR turnover days are calculated by analyzing the AR activity summary data. At step 2008, customer data including a customer location, a type of customer business, terms provided, credit limit and credit insurance limit is updated. At step 2010, the database 202 is updated with the customer data, for evaluation, reconciliation and for generating customizable analytical reports for the current accounting period.

Figure 21:
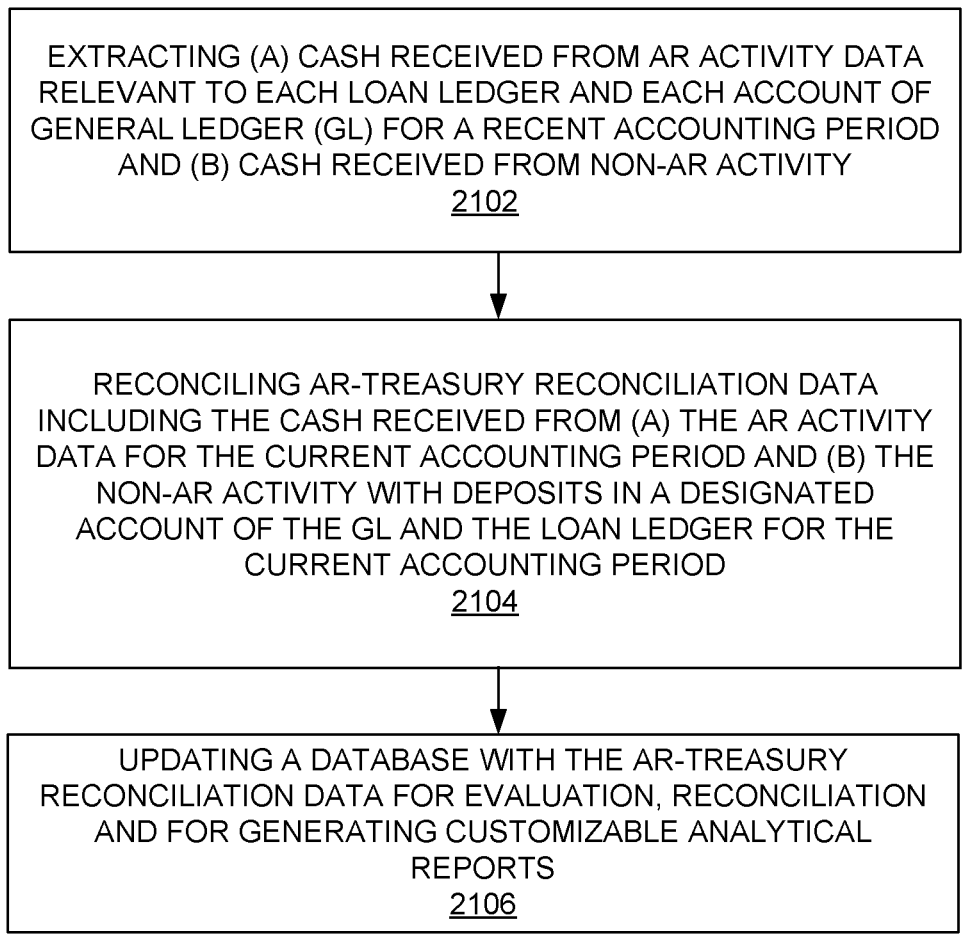
FIG. 21 is a flow diagram that illustrates a method of updating the database with AR-treasury reconciliation data according to an embodiment herein.

FIG. 21 is a flow diagram that illustrates a method of updating the database 202 with AR-treasury reconciliation data according to an embodiment herein. At step 2102, (a) cash received from AR activity data relevant to each loan ledger and each account of GL for recent accounting period and (b) cash received from non-AR activity are extracted. At step 2104, AR-treasury reconciliation data including the cash received from (a) the AR activity data for the current accounting period and (b) the non-AR activity is reconciled with deposits in a designated account of the GL and the loan ledger for the current accounting period. At step 2106, the database 202 is updated with the AR-treasury reconciliation data for evaluation, reconciliation and for generating customizable analytical reports.

Figure 22:
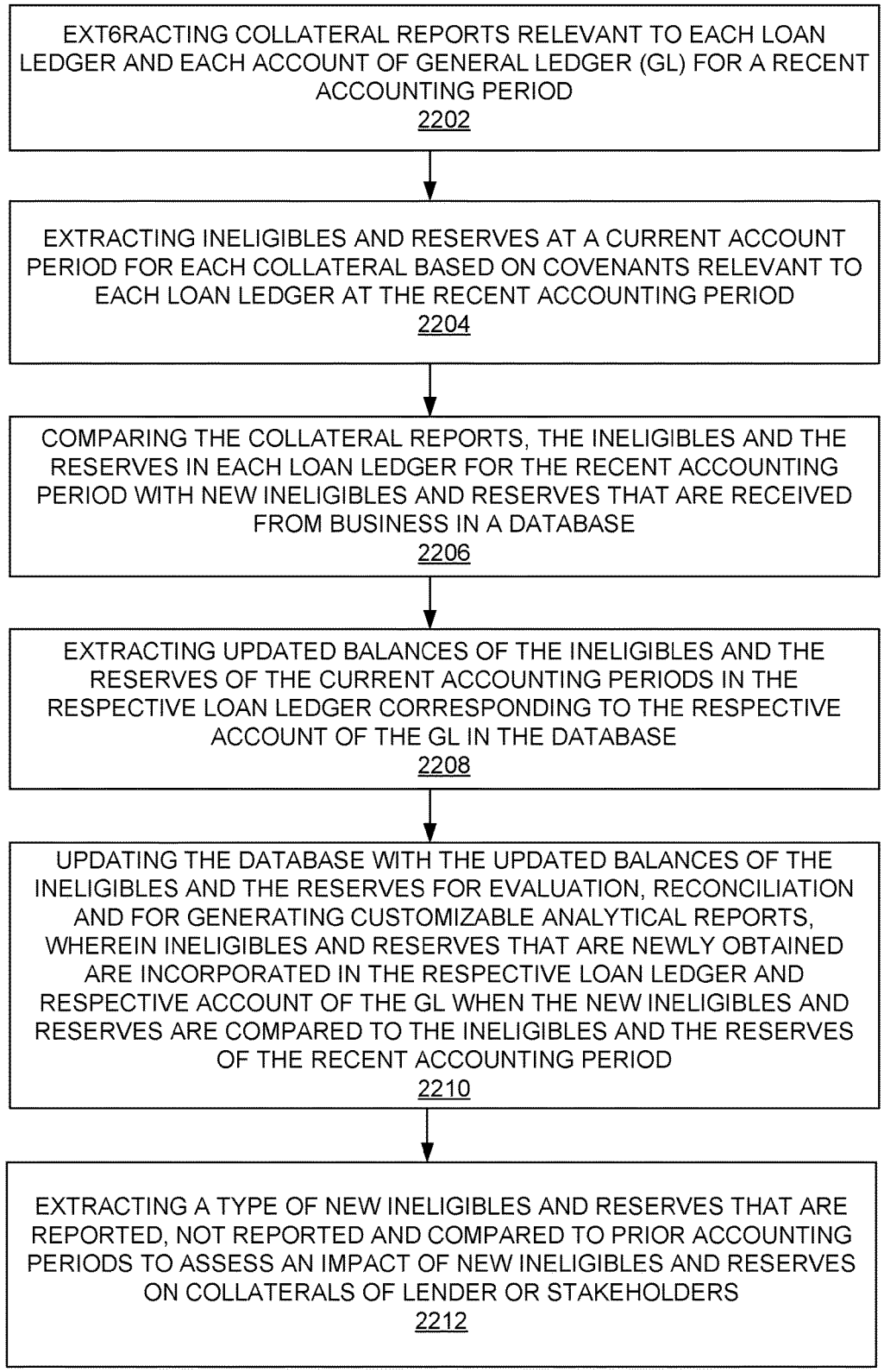
FIG. 22 is a flow diagram that illustrates a method of updating the database with updated balance of ineligibles and reserves based on collateral reports according to an embodiment herein.

FIG. 22 is a flow diagram that illustrates a method of updating the database 202 with updated balance of ineligible collateral and reserves based on collateral reports according to an embodiment herein. At step 2202, collateral reports relevant to each loan ledger and each account of GL for a recent accounting period are extracted. At step 2204, ineligibles and reserves are extracted at a current account period for each collateral based on covenants relevant to each loan ledger at the recent accounting period. At step 2206, the collateral reports, the ineligibles and the reserves in each loan ledger for the recent accounting period are compared with new ineligibles and reserves that are received from business in the database 202. At step 2208, updated balances of the ineligibles and the reserves of the current accounting periods in the respective loan ledger corresponding to the respective account of the GL in the database is extracted. At step 2210, the database 202 is updated with the updated balances of the ineligibles and the reserves for evaluation, reconciliation and for generating customizable analytical reports. In an embodiment, the newly obtained ineligibles and reserves are incorporated in the respective loan ledger and respective account of the GL when the new ineligibles and reserves are compared to the ineligibles and the reserves of the recent accounting period. At step 2212, a type of the new ineligibles and reserves that are reported, not reported and compared to prior accounting periods is extracted to assess an impact of the new ineligibles and reserves on the collaterals of the lender or stakeholders.

Figure 23:
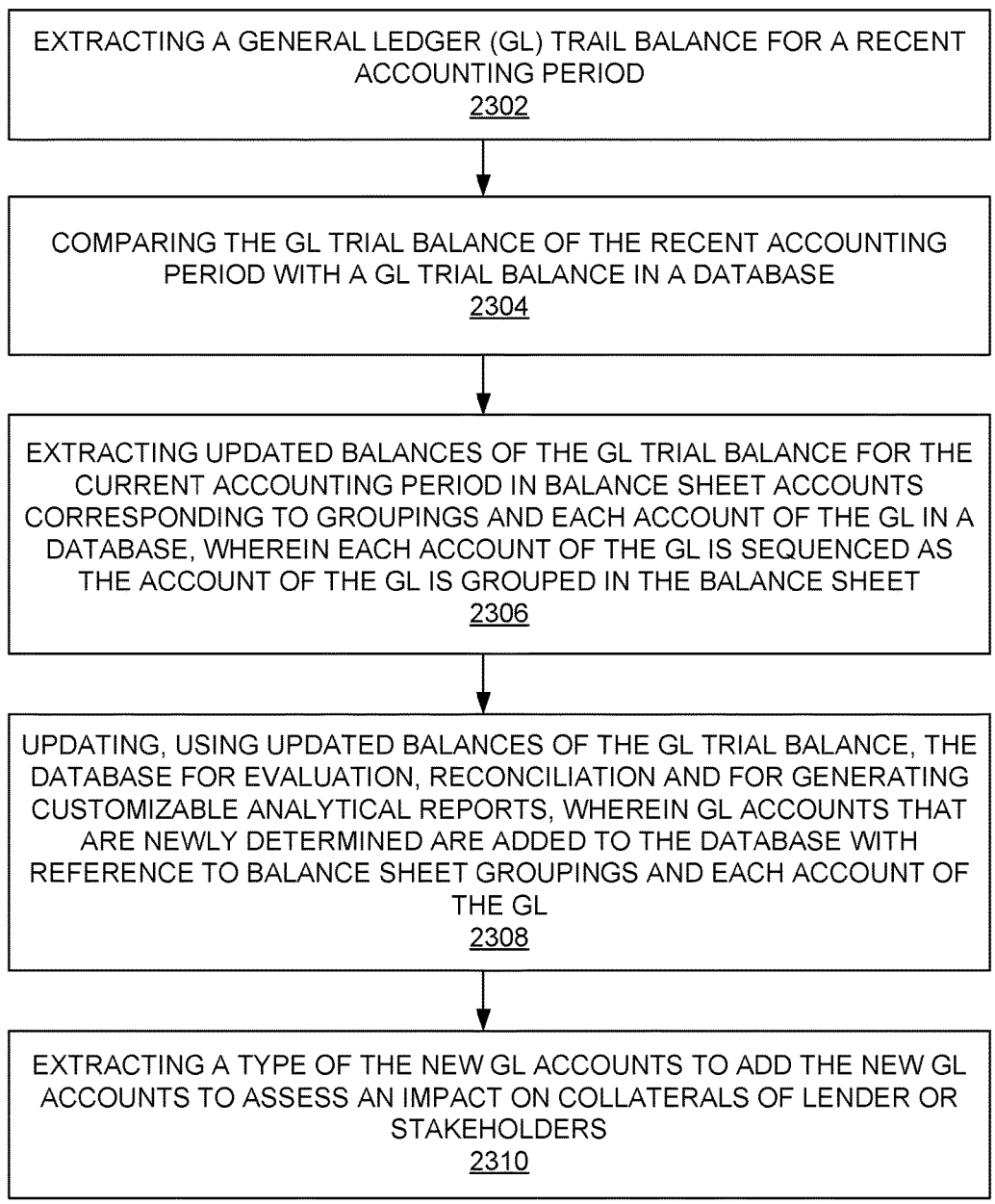
FIG. 23 is a flow diagram that illustrates a method of updating the database using updated balances of general ledger trial balance according to an embodiment herein.

FIG. 23 is a flow diagram that illustrates a method of updating the database 202 using updated balances of general ledger trial balance according to an embodiment herein. At step 2302, a GL trail balance for a recent accounting period is extracted. At step 2304, the GL trail balance of the recent accounting period is compared with a GL trial balance in the database 202. At step 2306, updated balances of the GL trial balance for the current accounting period in balance sheet accounts corresponding to groupings and each account of the GL in the database 202 is extracted. In an embodiment, each account of the GL is sequenced as the account of the GL is grouped in the balance sheet. At step 2308, the database 202 is updated for evaluation, reconciliation and for generating customizable analytical reports using updated balances of the GL trial balance. The GL accounts that are newly determined are added to the database 202 with reference to balance sheet groupings and each account of the GL. At step 2310, a type of the new GL accounts to add the new GL accounts is extracted to assess an impact on the collaterals of the lender or stakeholders.

Figure 24:
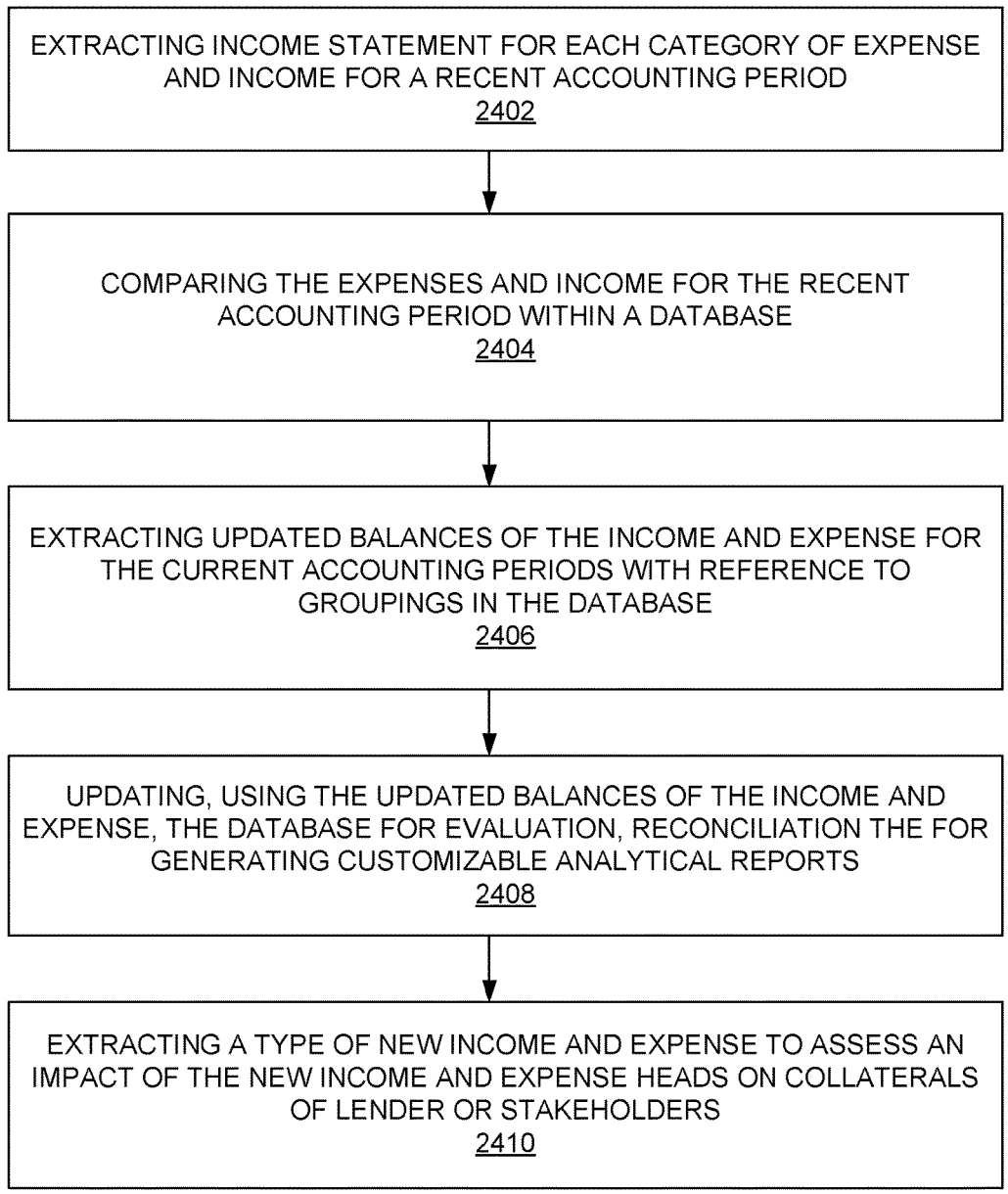
FIG. 24 is a flow diagram that illustrates a method of updating the database using updated balances of income and expense according to an embodiment herein.

FIG. 24 is a flow diagram that illustrates a method of updating the database 202 using updated balances of income and expense according to an embodiment herein. At step 2402, an income statement for each category of expense and income for a recent accounting period is extracted. At step 2404, expenses and income for the recent accounting period is compared within the database 202. At step 2406, updated balances of the income and expense for the current accounting periods with reference to groupings in the database are extracted. At step 2408, the database 202 for evaluation, reconciliation and for generating customizable analytical reports is updated using the updated balances of the income and expenses. At step 2410, a type of new income and expense is extracted to assess an impact of the new income and expense heads on the collaterals of the lender or stakeholders.

Figure 25:
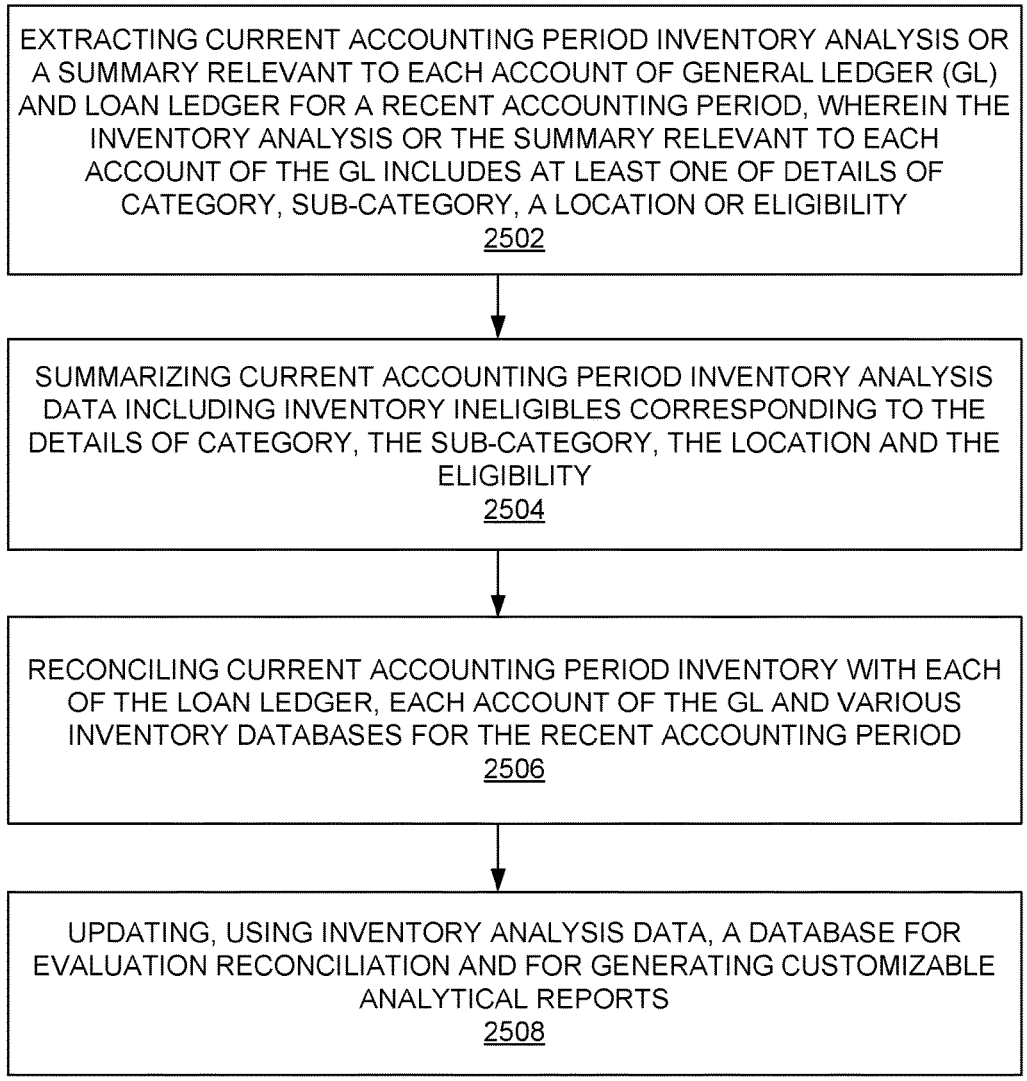
FIG. 25 is a flow diagram that illustrates a method of updating the database using inventory analysis data according to an embodiment herein.

FIG. 25 is a flow diagram that illustrates a method of updating the database 202 using inventory analysis data according to an embodiment herein. At step 2502, a current accounting period inventory analysis or a summary relevant to each account of GL and loan ledger for a recent accounting period is extracted. The current accounting period inventory analysis or the summary relevant to each account of the GL includes at least one of details of category, sub-category, a location or eligibility. At step 2504, current accounting period inventory analysis data including inventory ineligibles is summarized corresponding to at least one of the details of category, the sub-category, the location or the eligibility. At step 2506, inventory is reconciled with each of the loan ledger, each account of the GL and various inventory databases for the recent accounting period. At step 2508, the database 202 is updated for evaluation, reconciliation and for generating customizable analytical reports using inventory analysis data.

Figure 26:
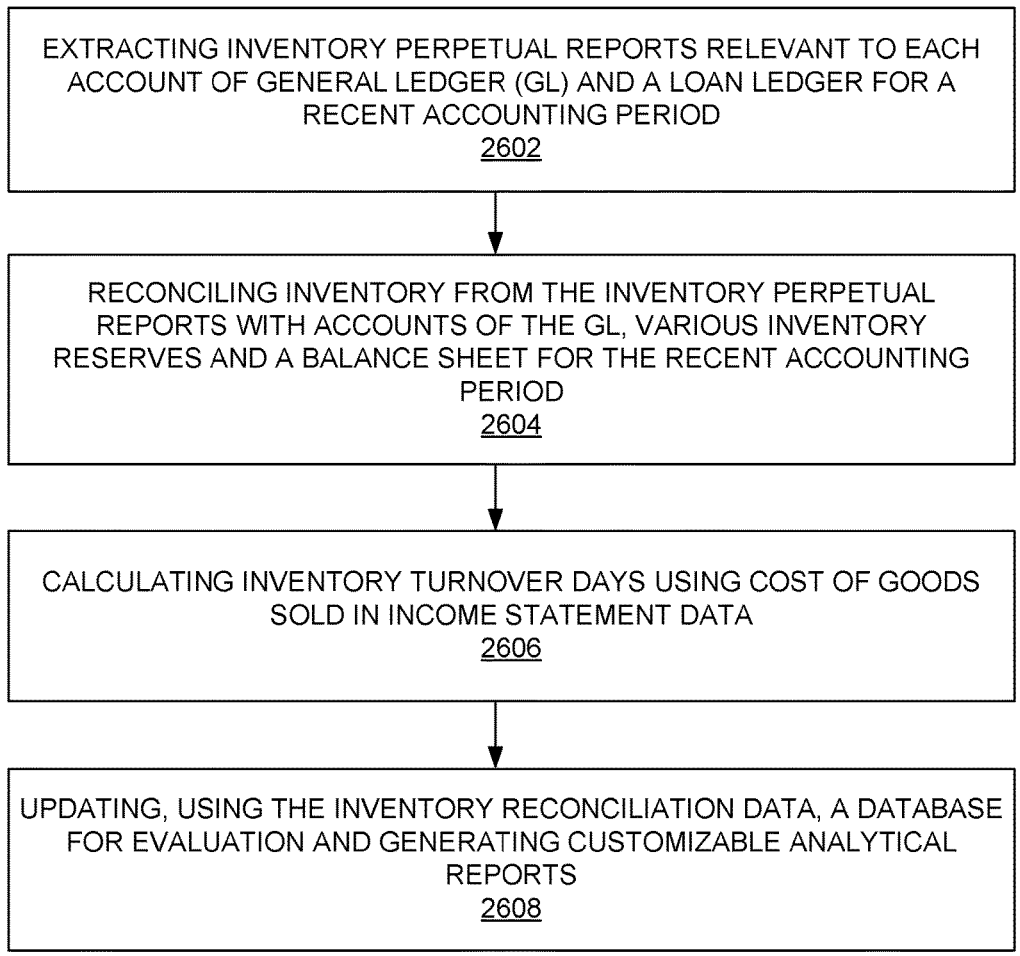
FIG. 26 is a flow diagram that illustrates a method of updating the database using inventory reconciliation data according to an embodiment herein.

FIG. 26 is a flow diagram that illustrates a method of updating the database 202 using inventory reconciliation data according to an embodiment herein. At step 2602, inventory perpetual reports relevant to each account of GL and loan ledger for a recent accounting period are extracted. At step 2604, inventory data from the inventory perpetual reports is reconciled with accounts of the GL, various inventory reserves and a balance sheet for the recent accounting period. At step 2606, inventory turnover days are calculated using cost of goods sold in income statement data. At step 2608, the database 202 is updated for evaluation and generating customizable analytical reports using inventory reconciliation data.

Figure 27:
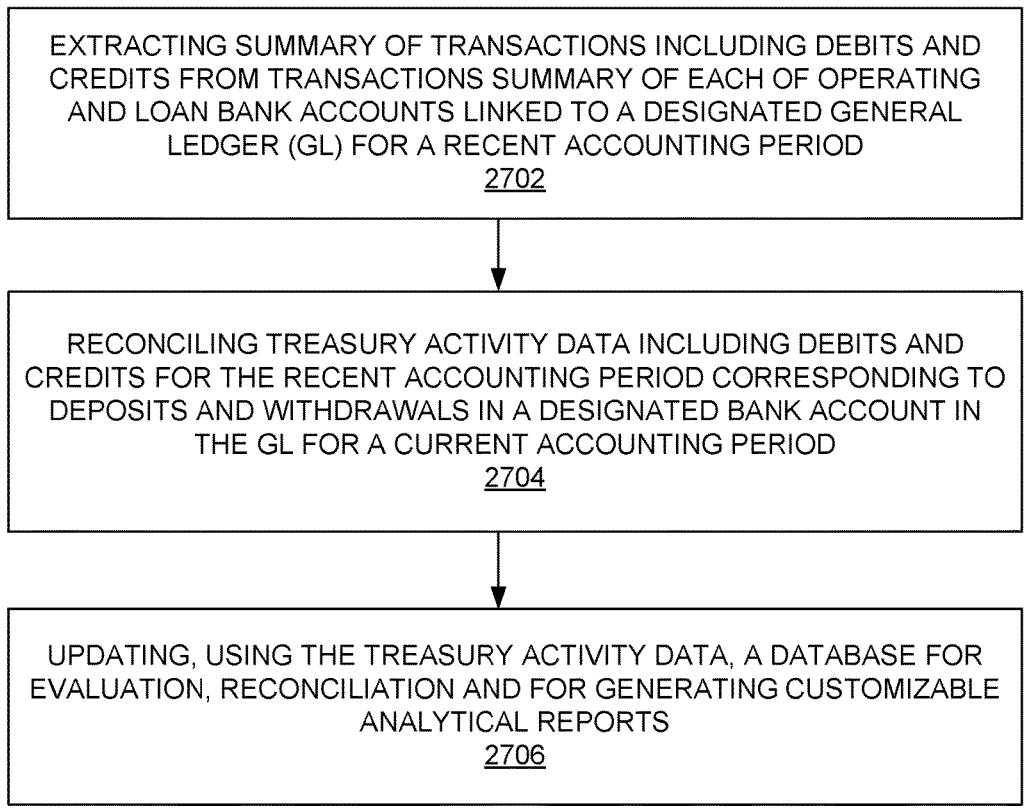
FIG. 27 is a flow diagram that illustrates a method of updating the database using treasury activity data according to an embodiment herein.
Figure 28A:
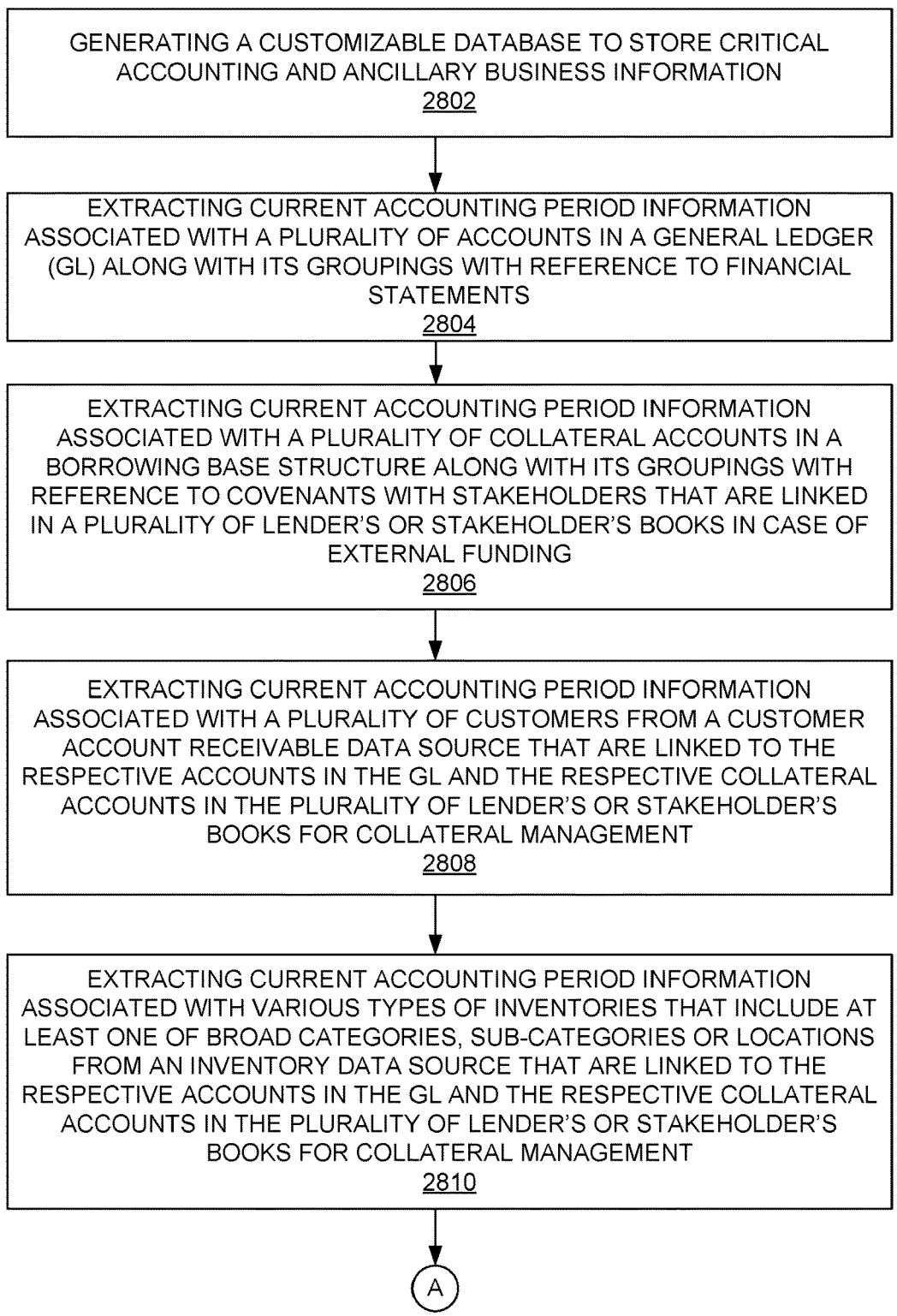
FIGS. 28A-28D are flow diagrams that illustrate a method for managing a collateral risk and a business performance of an entity using a machine learning model according to an embodiment herein.
Figure 28B:
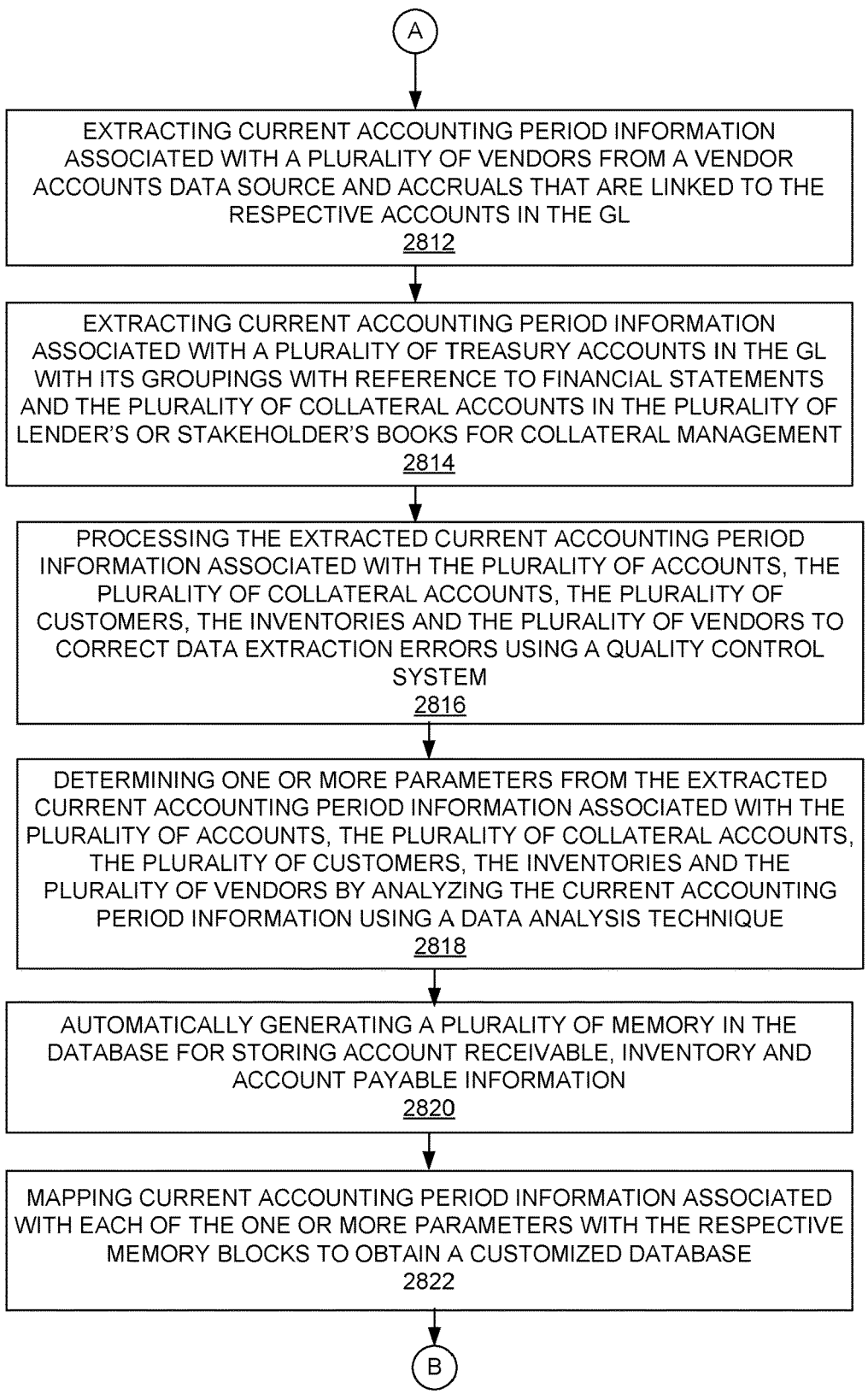
Figure 28C:
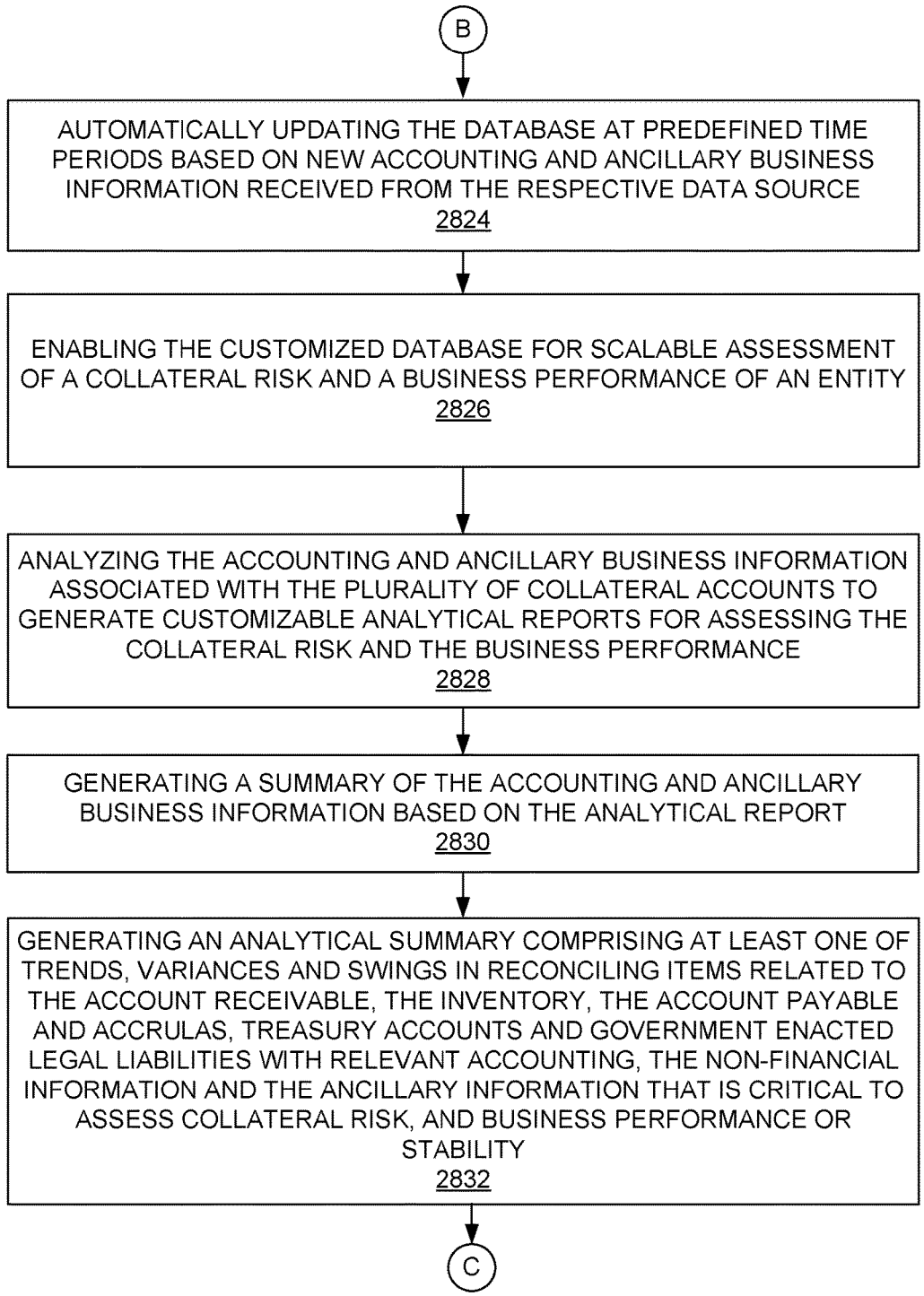
Figure 28D:
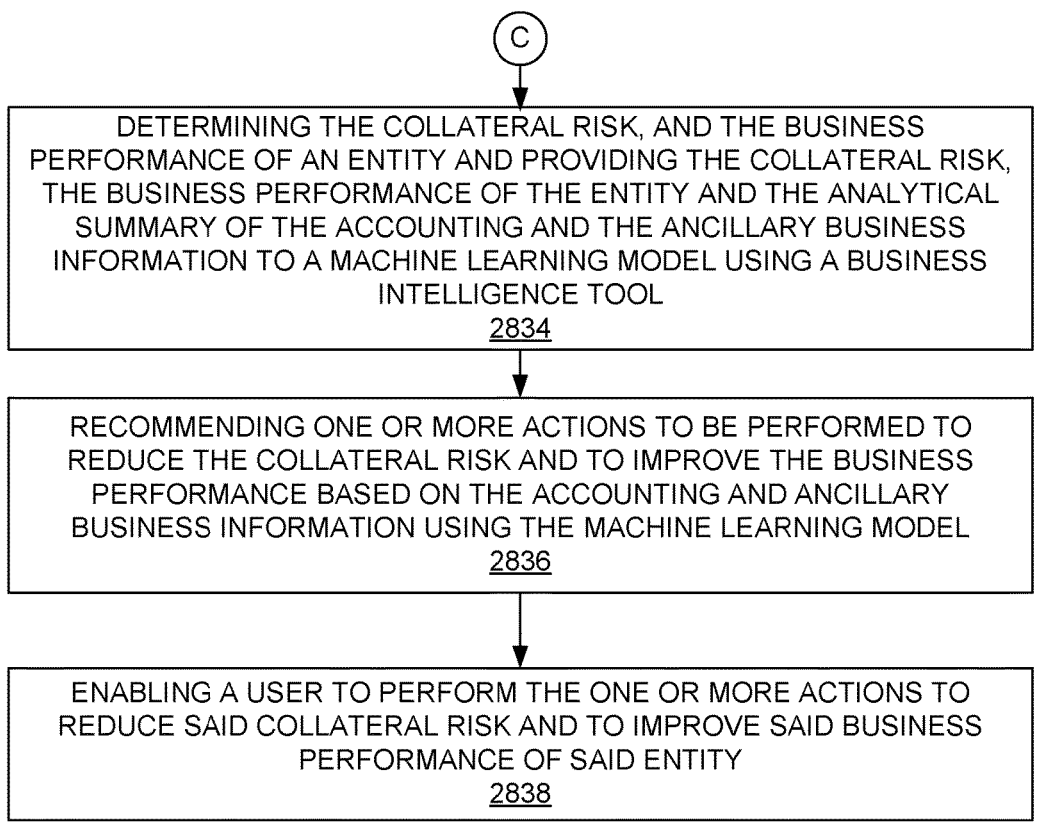

FIG. 27 is a flow diagram that illustrates a method of updating the database 202 using treasury activity data according to an embodiment herein. At step 2702, summary of transactions including debits and credits from transactions summary of each of operating and loan bank accounts linked to a designated GL for a recent accounting period is extracted. At step 2704, treasury activity data including debits and credits for the recent accounting period corresponding to deposits and withdrawals in a designated bank account in the GL for a current accounting period is reconciled. At step 2706, the database 202 is updated for evaluation, reconciliation and for generating customizable analytical reports.

FIGS. 28A-28D are flow diagrams that illustrate a method for managing a collateral risk and a business performance of an entity using a machine learning model according to an embodiment herein. At step 2802, a customizable database is generated to store critical accounting and ancillary business information. At step 2804, current accounting period information associated with a plurality of accounts in a general ledger (GL) along with its groupings with reference to financial statements is extracted. In an embodiment, the current accounting period information associated with the plurality of accounts is obtained from an accounts data system 112. The information includes at least one of (i) different currency account payable, (ii) account payable sub-ledger or (c) different treasury (bank) accounts. At step 2806, current accounting period information associated with a plurality of collateral accounts in a borrowing base structure along with its groupings with reference to covenants with stakeholders that are linked in a plurality of lender's or stakeholder's books in case of external funding is extracted. The information associated with the collateral accounts includes at least one of account receivable, an inventory or other collateral. At step 2808, current accounting period information associated with a plurality of customers is obtained from a customer account receivable data system 114 that are linked to the respective accounts in the GL and the respective collateral accounts in the plurality of lender's or stakeholder's books for collateral management is extracted. The information associated with the plurality of customers includes a summary of periodical transactions associated with the plurality of customers with reference to a type of the respective periodical transactions. At step 2810, current accounting period information associated with various types of inventories that include at least one of broad categories, sub-categories or locations is extracted from an inventory data system 116 that are linked to the respective accounts in the GL and the respective collateral accounts in the plurality of lender's or stakeholder's books for collateral management is extracted. The information associated with the inventory includes a summary of period end status of the inventories. At step 2812, current accounting period information associated with a plurality of vendors is extracted from a vendor accounts data system 118 and accruals that are linked to the respective accounts in the GL are extracted. The information associated with the plurality of vendors includes a summary of periodical transactions associated with the plurality of vendors with reference to a type of the respective periodical transactions. At step 2814, current accounting period information associated with a plurality of treasury accounts in the GL with its groupings with reference to financial statements and the plurality of collateral accounts in the plurality of lender's or stakeholder's books for collateral management is extracted. In an embodiment, the current accounting period information associated with the plurality of treasury accounts from a treasury accounts data system 120. At step 2816, the extracted current accounting period information associated with the plurality of accounts, the plurality of collateral accounts, the plurality of customers, the inventories and the plurality of vendors are processed using a quality control system to correct data extraction errors. At step 2818, one or more parameters from the extracted current accounting period information associated with the plurality of accounts, the plurality of collateral accounts, the plurality of customers, the inventories and the plurality of vendors by analyzing the current accounting period information are determined using a data analysis technique. At step 2820, a plurality of memory in the database 202 are automatically generated for storing each of account receivable, inventory and account payable information. At step 2822, current accounting period information associated with each of the one or more parameters with the respective memory blocks are mapped to obtain a customized database. At step 2824, the database 202 is automatically updated at predefined time periods based on new accounting and ancillary business information received from the respective data system. At step 2826, the customized database is enabled for scalable assessment of a collateral risk and a business performance of an entity. At step 2828, the accounting and ancillary business information associated with the plurality of collateral accounts is analyzed to generate an analytical report for assessing the collateral risk and the business performance. At step 2830, a summary of the accounting and ancillary business information is generated based on the analytical report. At step 2832, an analytical summary includes at least one of trends, variances and swings in reconciling items on a consistent pattern related to the account receivable, the inventory, the accounts payable and accruals, treasury accounts and government enacted legal liabilities with relevant accounting, the non-financial information and the ancillary business information that is critical to assess the collateral risk, the business performance or stability is generated. At step 2834, the collateral risk, and the business performance of an entity are determined using a business intelligence tool and the collateral risk, and the business performance of the entity and the analytical summary of the accounting and the ancillary business information is provided to a machine learning model. At step 2836, one or more actions to be performed are recommended to reduce the collateral risk and to improve the business performance based on the accounting and ancillary business information using the machine learning model. At step 2838, the collateral risk and business performance assessment system 106 enables a user to perform the one or more actions (e.g. limiting an advance percentage or an amount etc. or other similar actions) to reduce the collateral risk and to improve the business performance of the entity.

Figure 29:
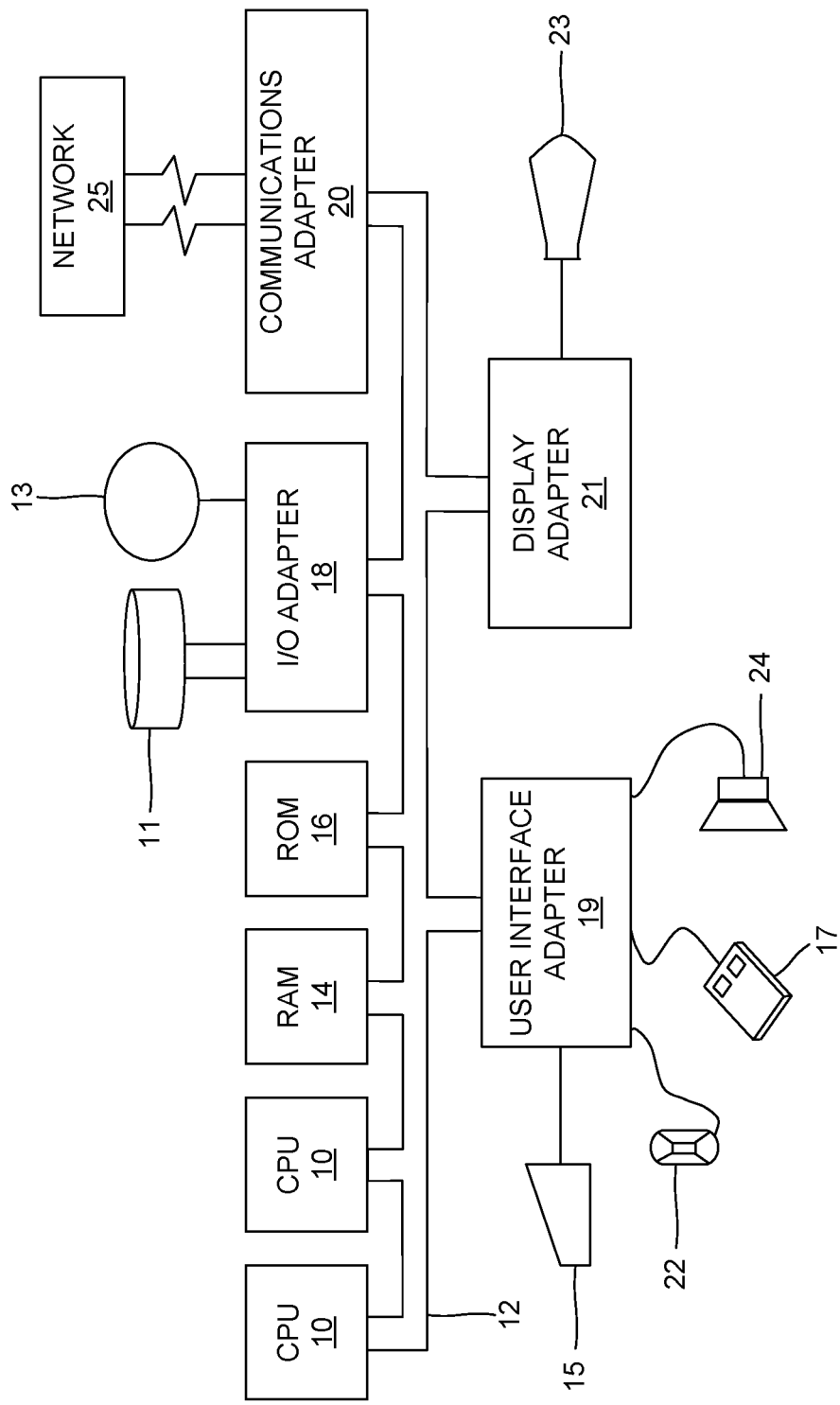
FIG. 29 is a computer system used in accordance with the embodiments herein.

FIG. 29, with reference to FIGS. 1 through 28B, is the computer system 104 of FIG. 1 used in accordance with the embodiments herein. The computer system 104 may include one or more of a personal computer, a laptop, a tablet device, a Smartphone, a mobile communication device, a personal digital assistant, or any other such computing device, in one example embodiment, in another example embodiment. This schematic drawing illustrates a hardware configuration of the computer system 104 in accordance with the embodiments herein. The computer system 104 includes one or more processor (e.g., the processor 108) or central processing unit (CPU) 10. The CPUs 10 are interconnected via system bus 12 to various devices such as a memory 14, read-only memory (ROM) 16, and an input/output (I/O) adapter 18. Although, CPUs 10 are depicted, it is to be understood that the computer system 104 may be implemented with only one CPU.

The I/O adapter 18 can connect to peripheral devices, such as disk units 11 and tape drives 13, or other program storage devices that are readable by the system. The computer system 104 can read the inventive instructions on the program storage devices and follow these instructions to execute the methodology of the embodiments herein. The computer system 104 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. One or more non-transitory computer readable storage medium storing one or more sequences of instructions, which when executed by one or more processors, perform a method for automatically determining collateral risk using a business intelligence tool by training a machine learning model, and generating a recommendation using the machine learning model, said method comprising:

(a) generating a customizable database to store critical accounting and ancillary business information, wherein said database is generated by extracting current accounting period information associated with a plurality of accounts in a general ledger (GL) along with its groupings with reference to financial statements, wherein said current accounting period information associated with said plurality of accounts is obtained from a general ledger accounts data system;

extracting current accounting period information associated with a plurality of collateral accounts in a borrowing base structure along with its groupings with reference to covenants with stakeholders that are linked in a plurality of lender's or stakeholder's books in case of external funding;

extracting current accounting period information associated with a plurality of customers, wherein said current accounting period information associated with said plurality of customers is obtained from a customer account receivable data system that are linked to the respective accounts in said GL and the respective collateral accounts in said plurality of lender's or stakeholder's books for collateral management;

extracting current accounting period information associated with various types of inventories that comprise at least one of broad categories, sub-categories or locations, wherein said current accounting period information associated with various types of inventories is obtained from an inventory data system that arc linked to the respective accounts in said GL and the respective collateral accounts in said plurality of lender's or stakeholder's books for collateral management;

extracting current accounting period information associated with a plurality of vendors, wherein said current accounting period information associated with said plurality of vendors is obtained from a vendor accounts data system and accruals that are linked to the respective accounts in said GL;

extracting current accounting period information associated with a plurality of treasury accounts in said GL with its groupings with reference to financial statements and said plurality of collateral accounts in said plurality of lender's or stakeholder's books for collateral management, wherein said current accounting period information associated with said plurality of treasury accounts is obtained from a treasury accounts data system;

automatically processing said extracted current accounting period information associated with said plurality of accounts, said plurality of collateral accounts, said plurality of customers, said inventories and said plurality of vendors to correct data extraction errors using a quality control system;

automatically determining one or more parameters from said extracted current accounting period information associated with said plurality of accounts, said plurality of collateral accounts, said plurality of customers, said inventories and said plurality of vendors by analyzing said current accounting period information using a data analysis technique;

automatically generating memory blocks in said database for each of said one or more parameters using a database generation technique upon receiving one or more inputs from a user; and mapping current accounting period information associated with each of said one or more parameters with the respective memory blocks to obtain a customized database, wherein said current accounting period information comprises at least one of account receivable, inventory and account payable information;

(b) automatically updating said customized database at predefined time periods based on new accounting and ancillary business information received from the respective data system;

(c) automatically enabling said customized database for scalable assessment of a collateral risk and a business performance of a entity, wherein said scalable assessment of said collateral risk and business performance comprises analyzing said accounting and ancillary business information associated with said plurality of collateral accounts to generate customizable analytical reports for assessing said collateral risk and said business performance;

implementing a summarization technique to generate a summary of said accounting and ancillary business information based on said analytical report, wherein said summary of said accounting and ancillary business Information comprises financial information that is critical and non-financial information to assess said collateral risk and business performance; and generating an analytical summary comprises at least one of trends, variances and swings in reconciling items on a consistent pattern related to said account receivable, said inventory, said accounts payable and accruals, treasury accounts and government enacted legal liabilities with relevant accounting, said non-financial information and said ancillary business information that is critical to assess said collateral risk, and said business performance or stability;

(d) determining, using a business intelligence tool, said collateral risk, and said business performance of an entity and providing said collateral risk, and said business performance of said entity and said analytical summary of said accounting and the ancillary business information to a machine learning model, wherein said machine learning model is generated by providing (i) a summary of accounting and ancillary business information of different entities comprising at least one of trends or variances in at least one of (A) reconciling items related to account receivable, inventory, accounts payable and accruals, treasury accounts, or government enacted legal liabilities with accounting, (B) non-financial information and ancillary business information that is critical to assess collateral risk, or (C) a business performance and a stability of different entities, (ii) calculated collateral risk and business performance of different entities, and (iii) a financial expert inputs on the summary, the calculated collateral risk, and the business performance of different entities, as training data;

(e) recommending, using the machine learning model, one or more actions to be performed to reduce said collateral risk and to improve said business performance based on said accounting and ancillary business information; and (f) enabling a user to perform the one or more actions to reduce said collateral risk and to improve said business performance of said entity.

2. The one or more non-transitory computer readable storage mediums storing one or more sequences of instructions of claim 1, wherein said method comprises automatically modifying said database for subsequent accounting periods by creating a new memory block for a new parameter when said information associated with said new parameter is received from the respective data system during a current accounting period.

3. The one or more non-transitory computer readable storage mediums storing one or more sequences of instructions of claim 1, wherein said method comprises automatically obtaining said accounting and ancillary business information related to a prior assessment or review from said plurality of memory in said database along with a summary of said non-financial and said financial information that are critical to generate a directive summary; and providing said directive summary of said financial information that are critical and said non-financial information to an examiner for assessment of said collateral risk and said business performance.

4. The one or more non-transitory computer readable storage mediums storing one or more sequences of instructions of claim 1, wherein creating said database comprises providing a data warehouse interface to enter said accounting and ancillary business information that are critical to a type of business for assessing business and collateral performance; and automatically storing maid critical accounting and ancillary business information in the respective memory blocks.

5. The one or more non-transitory computer readable storage mediums storing one or more sequences of instructions of claim 1, wherein creating said database comprises the steps of automatically determining a base currency to represent said account receivable, said inventory, said account payable, said accruals and said treasury accounts information in said database.

6. The one or more non-transitory computer readable storage mediums storing one or more sequences of instructions of claim 5, wherein said generating of said analytical report comprises comparing said accounting and ancillary business information associated with said accounting period of a current year with same accounting period of last year or years;

averaging or statistically analyzing said accounting and ancillary business information of said accounting period of said current year and aid last year or years; and generating an analytical report based on said trends, comparison of said accounting and ancillary business information with comparable prior periods based on a type and seasonality of said business and averaging or statistically analyzing of said accounting and ancillary business information.

7. The one or more non-transitory computer readable storage mediums storing one or more sequences of instructions of claim 6, wherein said generating of said analytical report comprises generating a snapshot of statistics of said accounting and ancillary business information associated with:
  (a) said plurality of customers based on business volume, credit terms, a credit limit, an account receivable (AR) insurance limit, a longevity of business relationship, a type of customers business, a classification of said customers, a business location, a recent dated credit rating, AR balances from maid customers who are critical for said business during recent accounting periods, a percentage AR from concentration accounts to a percentage AR of total business, changes or trends in said business volume and outstanding balances at recent accounting period compared to selected prior accounting periods, average AR balances, sales and collections from said critical customers during said accounting period, wherein periodical performance and said average AR balances from said critical customers of the selected prior accounting period are compared with said recent accounting period;
  (b) said plurality of vendors based on business volume, credit terms, a credit limit, a longevity of business relationship, a type of their business, a classification of said vendors, a business location, account payable (AP) balances from said customers who are critical for said business during recent accounting periods, a percentage AP from concentration accounts to a percentage AP of total business, changes or trends in said business volume and outstanding balances at recent accounting period compared to selected prior accounting periods, average AP balances, purchases and payments to said critical vendors during said accounting period, wherein periodical performance and said average AP balances from said critical customers of the selected prior accounting period are compared with said recent accounting period; and
  (c) a type, a plurality and composition of inventories based on business volume, a season of business, a type of business, a classification of said inventories, a location of said inventories that are critical for the business during the recent accounting periods, a percentage composition of critical inventory to a percentage of total business inventory, and changes or trends in said business volume and outstanding balances at recent accounting periods compared to selected prior accounting periods.

8. The one or more non-transitory computer readable storage mediums storing one or more sequences of instructions of claim 1, wherein said generating of said analytical report comprises
  tracking imminent risks that are associated with said account receivable, said inventory, said account payable, said accruals and said treasury accounts information in said database;
  analyzing inherent risks by trending and comparing for aging, shifting in aging, reconciling items, percentages, turnover days, performance of said account receivable, performance of key and critical customers, conversion of receivable into cash and said account payable associated with said account receivable information respectively for an accounting period;
  analyzing inherent risks by trending and comparing for aging, shifting in aging, reconciling items, percentages, turnover days, performance of said account payable and said accruals respectively for said accounting period; and
  analyzing a trend and comparison for categories, locations, reconciling items, turnover days, percentages of inventory categories associated with said inventory perpetual for said accounting period.

9. The one or more non-transitory computer readable storage mediums storing one or more sequences of instructions of claim 1, wherein said updating of said database comprises obtaining account payable (AP) activity system reports that are relevant to each account of said GL for a recent accounting period;
  extracting an exchange rate for a new accounting period which converts foreign AP from said database based on said covenants at said recent accounting period;
  reconciling AP sub-ledger balance of said recent accounting period with said plurality of accounts in said GL and AP accruals in the balance sheet for a current accounting period;
  applying said exchange rate for converting from said foreign AP to base currency AP;
  calculating AP turnover days by analyzing said AP activity system reports; and
  updating said database with said AP sub-ledger balance for evaluation, reconciliation and for generating customizable analytical reports.

10. The one or more non-transitory computer readable storage mediums storing one or more sequences of instructions of claim 1, wherein said updating of said database comprises
  obtaining account payable (AP) activity summary reports that are relevant to each account of said GL for a recent accounting period;
  reconciling AP activity data of said recent accounting period, with reference to a type or category of transactions based on said AP activity summary reports related to each account of said GL, for a current accounting period, wherein said type or category of said transactions comprises at least one of (a) gross purchases, (b) account debits or (c) cash or any adjustments posted to said AP, wherein said AP activity data comprise overall purchases, payments made and the resultant turnover day;
  calculating AP turnover days by analyzing said AP activity summary reports; and
  updating said database with said AP activity data for evaluation, reconciliation and for generating customizable analytical reports.

11. The one or more non-transitory computer readable storage mediums storing one or more sequences of instructions of claim 1, wherein said updating of said database comprises
  obtaining a summary of account payable (AP) outstanding and aging relevant to each critical vendor for a recent accounting period;
  updating outstanding AP data for each critical vendor of maid recent accounting period for a current accounting period;
  a calculating overall AP turnover days related to vendor payouts for said recent accounting period;
  updating vendor data comprising a vendor location, a type of vendor business, terms provided, credit limit for said current accounting period; and
  updating said database with said outstanding AP data for evaluation, reconciliation and for generating customizable analytical reports.

12. The one or more non-transitory computer readable storage mediums storing one or more sequences of instructions of claim 1, wherein said updating of said database comprises
- obtaining account receivable (AR) activity reports that are relevant to each loan ledger and each account in said GL for a recent accounting period;
- extracting an exchange rate which converts foreign AR collateral based on said covenants, said loan ledger of said recent accounting period for a current accounting period;
- a reconciling AR sub-ledger balance that are relevant to each loan ledger of said recent accounting period with said plurality of accounts of said GL, and in said balance sheet for said current accounting period;
- applying said exchange rate at said recent accounting period and for converting from said foreign AR to base currency AR;
- calculating AR turnover days by analyzing said relevant AR activity reports; and
- updating said database with said AR sub-ledger balance for evaluation, reconciliation and for generating customizable analytical reports.

13. The one or more non-transitory computer readable storage mediums storing one or more sequences of instructions of claim 1, wherein said updating of said database comprises
- obtaining account receivable (AR) activity summary reports that are relevant to each loan ledger and each account of said GL for a recent accounting period end;
- reconciling AR activity data of said recent accounting period, with reference to a type or category of transactions based on said AR activity summary reports related to each loan ledger and each account of said GL, for a current accounting period, wherein said type or category of said transactions comprises at least one of (a) gross sales, (b) dilutive or non-dilutive credits issued or (c) cash collected for any adjustments posted to said AR, wherein said AR activity data comprise overall sales, payments received, credits given or adjustment posted and resultant turnover days;
- calculating AR turnover days and dilution in percentage by analyzing said AR activity summary reports; and
- is updating said database with said AR activity data for evaluation, reconciliation and for generating customizable analytical reports.

14. The one or more non-transitory computer readable storage mediums storing one or more sequences of instructions of claim 1, wherein said updating of said database comprises
- obtaining collateral reports relevant to each loan ledger and each account of said GL for a recent accounting period;
- obtaining ineligibles and reserves at a current account period for each collateral based on said covenants relevant to each loan ledger at said recent accounting period;
- comparing said collateral reports, said ineligibles and said reserves in each loan ledger for said recent accounting period with new ineligibles and reserves that are received from said business in mid database;
- obtaining updated balances of said ineligibles and said reserves of said current accounting periods in the respective loan ledger corresponding to the respective account of said GL in said database;
- updating said database with said updated balances of said ineligibles and said reserves for evaluation, reconciliation and for generating customizable analytical reports, wherein ineligibles and reserves that are newly obtained are incorporated in said respective loan ledger and respective account of said GL when said new ineligibles and reserves are compared to said ineligibles and said reserves of said recent accounting period; and
- obtaining a type of said new ineligibles and reserves that are reported, not reported and compared to prior accounting periods to assess an impact of said new ineligibles and reserves on said collaterals of said lender or stakeholders.

15. The one or more non-transitory computer readable storage mediums storing one or more sequences of instructions of claim 1, wherein said updating of said database comprises
- obtaining a GL trail balance for a recent accounting period;
- comparing said GL trial balance of said recent accounting period with a GL trial balance in said database;
- obtaining updated balances of said GL trial balance for said current accounting period in balance sheet accounts corresponding to groupings and each account of said GL in said database, wherein each account of said GL is sequenced as said account of said GL is grouped in said balance sheet;
- updating, using updated balances of said GL trial balance, said database for evaluation, reconciliation and for generating customizable analytical reports, wherein GL accounts that are newly determined are added to said database with reference to balance sheet groupings and each account of said GL; and
- obtaining a type of said new GL accounts to add said new GL accounts to assess an impact on said collaterals of said lender or stakeholders.

16. The one or more non-transitory computer readable storage mediums storing one or more sequences of instructions of claim 1, wherein said updating of said database comprises
- obtaining income statement for each category of expense and income for a recent accounting period;
- comparing said expenses and income for said recent accounting period within said database;
- obtaining updated balances of maid income and expense for said current accounting periods with reference to groupings in said database;
- updating, using said updated balances of said income and expense, said database for evaluation, reconciliation and for generating customizable analytical reports; and
- obtaining a type of new income and expense to assess an impact of said new income and expense heads on said collaterals of said lender or stakeholders.

17. The one or more non-transitory computer readable storage mediums storing one or more sequences of instructions of claim 1, wherein said updating of said database comprises
- obtaining current accounting period inventory analysis or a summary relevant to each account of said GL and loan ledger for a recent accounting period, wherein said inventory analysis or said summary relevant to each account of said GL comprises at least one of details of category, sub-category, a location or eligibility;
- summarizing current accounting period inventory analysis data comprising inventory ineligibles corresponding to at least one of said details of category, said sub-category, said location or said eligibility;

reconciling current accounting period inventory with each of said loan ledger, each account of said GL and various inventory databases for said recent accounting period; and updating, using inventory analysis data, said database for evaluation, reconciliation and for generating customizable analytical reports.

18. The one or more non-transitory computer readable storage mediums storing one or more sequence of instructions of claim 1, wherein said updating of said database comprises obtaining inventory perpetual reports relevant to each account of said GL and said loan ledger for a recent accounting period, wherein said inventory perpetual reports are system generated inventory status reports as of a particular date;

reconciling inventory data from said inventory perpetual reports with accounts of said GL, various inventory reserves and a balance sheet for said recent accounting period;

calculating inventory turnover days using cost of goods sold in income statement data; and updating, using said inventory reconciliation data, said database for evaluation and generating customizable analytical reports.

19. A system for automatically determining collateral risk using a business intelligence tool by training a machine learning model, and generating a recommendation using the machine learning model, said system comprising:

a memory that stores a set of instructions; and a processor that executes said set of instructions and is configured to:

(a) generate a customizable database to store critical accounting and a ancillary business information, wherein said database is created by extracting current accounting period information associated with a plurality of accounts in a general ledger (GL) along with its groupings with reference to financial statements, wherein said current accounting period information associated with said plurality of accounts is obtained from a general ledger accounts data system;

extracting current accounting period information associated with a plurality of collateral accounts in a borrowing base structure along with its groupings with reference to covenants with stakeholders that are linked in a plurality of lender's or stakeholder's books in case of external funding;

extracting current accounting period information associated with a plurality of customers, wherein said current accounting period information associated with said plurality of customers is obtained from a customer account receivable data system that me linked to the respective accounts in said GL and the respective collateral accounts in said plurality of lender's or stakeholder's books for collateral management;

extracting current accounting period information associated with various types of inventories that comprise at least one of broad categories, sub-categories or locations, wherein said current accounting period information associated with various types of inventories is obtained from an inventory data system that are linked to the respective accounts in said GL and the respective collateral accounts in said plurality of lender's or stakeholder's books for collateral management;

extracting current accounting period information associated with a plurality of vendors, wherein said current accounting period information associated with said plurality of vendors is obtained from a vendor accounts data system and accruals that are linked to the respective accounts in said GL; and extracting, current accounting period information associated with a plurality of treasury accounts in said GL with its groupings with reference to financial statements and said plurality of collateral accounts in said plurality of lender's or stakeholder's books for collateral management, wherein said current accounting period information associated with said plurality of treasury accounts is obtained from a treasury accounts data system;

automatically processing said extracted current accounting period information associated with said plurality of accounts, said plurality of collateral accounts, said plurality of customers, said inventories and said plurality of vendors to correct data extraction errors using a quality control system;

automatically determining one or more parameters from said extracted current accounting period information associated with said plurality of accounts, said plurality of collateral accounts, said plurality of customers, said inventories and said plurality of vendors by analyzing said current accounting period information using a data analysis technique;

automatically generating memory blocks in said database for each of said one or more parameters using a database generation technique upon receiving one or more inputs from a user; and mapping current accounting period information associated with each of said one or more parameters with the respective memory blocks to obtain a customized database, wherein said current accounting period information comprises at least one of account receivable, inventory and account payable information;

(b) automatically update said customized database at predefined time periods based on new accounting and ancillary business information received from the respective data system;

(c) automatically enable said customized database for scalable assessment of a collateral risk and a business performance of an entity, wherein said scalable assessment of said collateral risk and business performance comprises analyzing said a counting and ancillary business information associated with said plurality of collateral accounts to generate customizable analytical reports for assessing said collateral risk and said business performance;

implementing a summarization technique to generate a summary of said accounting and ancillary business information based on said analytical report, wherein said summary of said accounting and ancillary business information comprises financial information that is critical and non-financial information to assess said collateral risk and business performance; and generating an analytical summary comprises at least one of trends, variances and swings in reconciling items on a coistent pattera related to said account receivable, said inventory, said accounts payable and accruals, treasury accounts and government enacted legal liabilities with relevant accounting, said non-financial information and said ancillary business information that is critical to assess said collateral risk, and said business so performance or stability;

(d) determine, using a business intelligence tool, said collateral risk, and said business performance of an entity and provide said collateral risk, and said business performance of said entity and said analytical summary of said accounting and the ancillary business information to a machine learning model, wherein said machine learning model is generated by providing (i) a summary of accounting and ancillary business information of different entities comprising at least one of trends or variances in at least one of (A) reconciling items related to account receivable, inventory, accounts payable and accruals, treasury accounts, or government enacted legal liabilities with accounting, (B) non-financial information and ancillary business information that is critical to assess collateral risk, or (C) a business performance and a stability of different entities, (ii) calculated collateral risk and business performance of different entities, and (iii) a financial expert inputs on the summary, the calculated collateral risk, and the business performance of different entities, as training data;

(e) recommend one or more actions to be performed to reduce said collateral risk and to improve said business performance based on said accounting and ancillary business information using the machine learning model; and (f) enable a user to perform the one or more actions to reduce said collateral risk and to improve said business performance of said entity.

20. A method for automatically determining collateral risk using a business intelligence tool by training a machine learning model, and generating a recommendation using the machine learning model, said method comprising:

(a) generating a customizable database to store critical accounting and ancillary business information, wherein said database is generated by extracting current accounting period information associated with a plurality of accounts in a general ledger (GL) along with its groupings with reference to financial statements, wherein said current accounting period information associated with said plurality of accounts is obtained from a general ledger accounts data system;

extracting current accounting period information associated with a plurality of collateral accounts In a borrowing base structure along with its groupings with reference to covenants with stakeholders that are linked in a plurality of lender's or stakeholder's books in case of external funding;

extracting current accounting period information associated with a plurality of customers, wherein said current accounting period information associated with said plurality of customers is obtained from a customer account receivable data system that are linked to the respective accounts in said GL and the respective collateral accounts in said plurality of lender's or stakeholder's books for collateral management;

extracting current accounting period information associated with various types of inventories that comprise at least one of broad categories, sub-categories or locations, wherein said current accounting period information associated with various types of inventories is obtained from an inventory data system that are linked to the respective accounts in said GL and the respective collateral accounts in said plurality of lender's or stakeholder's books for collateral management;

extracting current accounting period information associated with a plurality of vendors, wherein said current accounting period information associated with said plurality of vendors is obtained from a vendor accounts data system and accruals that are linked to the respective accounts in said GL;

extracting current accounting period information associated with a plurality of treasury accounts in said GL with its groupings with reference to financial statements and said plurality of collateral accounts in said plurality of lender's or stakeholder's books for collateral management, wherein said current accounting period information associated with said plurality of treasury accounts is obtained from a treasury accounts data system;

automatically processing said extracted current accounting period information associated with said plurality of accounts, said plurality of collateral accounts, said plurality of customers, said inventories and said plurality of vendors to correct data extraction errors using a quality control system;

automatically determining one or more parameters from said extracted current accounting period information associated with mid plurality of accounts, said plurality of collateral accounts, said plurality of customers, said inventories and said plurality of vendors by analyzing said current accounting period information using a data analysis technique;

automatically generating memory blocks in said database for each of said one or more parameters using a database generation technique upon receiving one or more inputs from a user; and mapping current accounting period information associated with each of said one or more parameters with the respective memory blocks to obtain a customized database, wherein said current accounting period information comprises at least one of account receivable, inventory and account payable information;

(b) automatically updating said customized database at predefined time periods based on new accounting and ancillary business information received from the respective data system;

(c) automatically enabling said customized database for scalable assessment of a collateral risk and a business performance of an entity, wherein said scalable assessment of said collateral risk and business performance comprises analyzing said accounting and ancillary business information associated with said plurality of collateral accounts to generate customizable analytical reports for assessing said collateral risk and said business performance;

implementing a summarization technique to generate a summary of said accounting and ancillary business information based on said analytical report, wherein said summary of said accounting and ancillary business information comprises financial information that is critical and non-financial information to assess said collateral risk and business performance; and generating an analytical summary comprises at least one of trends, variances and swings in reconciling items on a consistent pattern related to said account receivable, said inventory, said accounts payable and accruals, treasury accounts a and government enacted legal liabilities with relevant accounting, said non-financial information and said ancillary business information that is critical to asses said collateral risk, and said business performance or stability;

(d) determining, using a business intelligence tool, said collateral risk, and said business performance of an entity and providing said collateral risk, and said business performance of said entity and said analytical summary of said accounting and the ancillary business information to a machine learning model, wherein said machine learning model is generated by providing (i) a summary of accounting and ancillary business information of different entities comprising at least one of trends or variances in at least one of (A) reconciling items related to account receivable, inventory, accounts payable and accruals, treasury accounts, or government enacted legal liabilities with accounting, (B) non-financial information and ancillary business information that is critical to assess collateral risk, or (C) a business performance and a stability of different entities, (ii) calculated collateral risk and business performance of different entities, and (iii) a financial expert inputs on the summary, the calculated collateral risk, ad the business performance of different entities, as raining data, (e) recommending, using the machine learning model, one or more actions to be performed to reduce said collateral risk and to improve said business performance based on said accounting and ancillary business information; and (f) enabling a user to perform the one or more actions to reduce said collateral risk and to improve said business performance of said entity.

* * * * *